US010129303B2

United States Patent
Morita et al.

(10) Patent No.: US 10,129,303 B2
(45) Date of Patent: Nov. 13, 2018

(54) TRANSMISSION SYSTEM, TRANSMISSION TERMINAL, AND TRANSMISSION METHOD

(71) Applicants: Kenichiro Morita, Tokyo (JP); Yohei Yamamoto, Tokyo (JP); Takuya Imai, Tokyo (JP); Shoh Nagamine, Kanagawa (JP); Hideki Shiro, Kanagawa (JP)

(72) Inventors: Kenichiro Morita, Tokyo (JP); Yohei Yamamoto, Tokyo (JP); Takuya Imai, Tokyo (JP); Shoh Nagamine, Kanagawa (JP); Hideki Shiro, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 256 days.

(21) Appl. No.: 14/878,361

(22) Filed: Oct. 8, 2015

(65) Prior Publication Data

US 2016/0112675 A1   Apr. 21, 2016

(30) Foreign Application Priority Data

Oct. 17, 2014   (JP) .................................. 2014-213207

(51) Int. Cl.
*H04N 7/14* (2006.01)
*H04L 29/06* (2006.01)
(Continued)

(52) U.S. Cl.
CPC ........ *H04L 65/403* (2013.01); *H04L 12/1813* (2013.01); *H04L 12/1822* (2013.01); *H04L 65/80* (2013.01); *H04N 7/15* (2013.01)

(58) Field of Classification Search
CPC ............. H04L 12/1813; H04L 12/1822; H04L 65/403; H04L 65/80
(Continued)

(56) References Cited

U.S. PATENT DOCUMENTS 5,812,865 A  *  9/1998  Theimer ................. G06F 9/547
                                                      379/88.13
6,570,606 B1 *  5/2003  Sidhu ..................... H04N 7/141
                                                      348/14.1
(Continued)

FOREIGN PATENT DOCUMENTS

JP    2001-128133 A    5/2001
JP    2002-149316 A    5/2002
(Continued)

OTHER PUBLICATIONS

Office Action dated Jul. 31, 2018 in Japanese Application No. 2014-213207, along with an English translation.

*Primary Examiner* — Hemant S Patel
(74) *Attorney, Agent, or Firm* — Oblon, McClelland, Maier & Neustadt, L.L.P.

(57) ABSTRACT

There is provided a transmission system transmitting at least one of image data and audio data among a plurality of transmission terminals. A first transmission terminal includes a state detector that detects whether a user is present therearound, and a controller that controls to transmit correspondence data corresponding to a result detected by the state detector to a second transmission terminal when a state detected by the state detector changes. The second transmission terminal changes quality of at least one of the image data and the audio data that is transmitted to the first transmission terminal in accordance with the correspondence data and transmits at least one of the image data and the audio data when the second transmission terminal receives the correspondence data.

52 Claims, 14 Drawing Sheets

(51) Int. Cl.
*H04L 12/18* (2006.01)
*H04N 7/15* (2006.01)

(58) Field of Classification Search
USPC .............. 348/14.01–14.16; 370/259–271,
370/351–357; 379/201.01,
379/202.01–207.01; 709/201–207,
709/217–248
See application file for complete search history.

(56) References Cited

U.S. PATENT DOCUMENTS

| | | | | |
|---|---|---|---|---|
| 7,535,484 | B2 * | 5/2009 | Lessing | H04N 7/148 348/14.01 |
| 8,842,153 | B2 * | 9/2014 | Ranganath | H04M 3/565 348/14.01 |
| 9,712,782 | B2 * | 7/2017 | Karimi-Cherkandi | H04N 7/147 |
| 2001/0037508 | A1 * | 11/2001 | Hindus | H04L 29/06 725/105 |
| 2010/0245538 | A1 * | 9/2010 | Marzano | H04N 7/147 348/14.12 |
| 2010/0284568 | A1 | 11/2010 | Tojo | |
| 2014/0099004 | A1 * | 4/2014 | DiBona | H04N 7/15 382/118 |
| 2014/0118475 | A1 | 5/2014 | Nagamine et al. | |
| 2014/0240450 | A1 | 8/2014 | Morita et al. | |
| 2014/0244460 | A1 | 8/2014 | Imai et al. | |
| 2014/0368410 | A1 | 12/2014 | Imai et al. | |

FOREIGN PATENT DOCUMENTS

| | | |
|---|---|---|
| JP | 2009-117896 A | 5/2009 |
| JP | 2010-124425 A | 6/2010 |
| JP | 4646668 | 12/2010 |
| JP | 2011-114699 A | 6/2011 |
| JP | 2011-151536 A | 8/2011 |
| JP | 2012-075073 | 4/2012 |
| JP | 2012-178621 A | 9/2012 |
| JP | 5398341 | 11/2013 |

* cited by examiner

FIG.7

RELAY DEVICE MANAGEMENT TABLE

| RELAY DEVICE ID | OPERATION STATE | RECEPTION DATE AND TIME | IP ADDRESS OF RELAY DEVICE | MAXIMUM DATA TRANSMISSION SPEED [Mbps] |
|---|---|---|---|---|
| 111a | ON-LINE | 2009.11.10.13:00 | 1.2.1.2 | 100 |
| 111b | ON-LINE | 2009.11.10.13:10 | 1.2.2.2 | 1000 |
| 111c | OFF-LINE | 2009.11.10.13:20 | 1.3.1.2 | 100 |
| 111d | ON-LINE | 2009.11.10.13:30 | 1.3.2.2 | 10 |

FIG.8

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.9

TERMINAL MANAGEMENT TABLE

| TERMI-NAL ID | DESTINATION NAME | OPERATION STATE | RECEPTION DATE AND TIME | IP ADDRESS OF TERMINAL |
|---|---|---|---|---|
| 01aa | JAPAN TOKYO BUSINESS OFFICE AA TERMINAL | ON-LINE (SPEECH STATE) | 2009.11.10.13:40 | 1.2.1.3 |
| 01ab | JAPAN TOKYO BUSINESS OFFICE AB TERMINAL | OFF-LINE | 2009.11.09.12:00 | 1.2.1.4 |
| ... | ... | ... | ... | ... |
| 01ba | JAPAN OSAKA BUSINESS OFFICE BA TERMINAL | ON-LINE (INTERRUPTION) | 2009.11.10.13:45 | 1.2.2.3 |
| 01bb | JAPAN OSAKA BUSINESS OFFICE BB TERMINAL | ON-LINE (SPEECH AVAILABLE) | 2009.11.10.13:50 | 1.2.2.4 |
| ... | ... | ... | ... | ... |
| 01ca | UNITED STATES OF AMERICA NEW YORK BUSINESS OFFICE CA TERMINAL | OFF-LINE | 2009.11.10.12:45 | 1.3.1.3 |
| 01cb | UNITED STATES OF AMERICA NEW YORK BUSINESS OFFICE CB TERMINAL | ON-LINE (DURING SPEECH) | 2009.11.10.13:55 | 1.3.1.4 |
| ... | ... | ... | ... | ... |
| 01da | UNITED STATES OF AMERICA WASHINGTON BUSINESS OFFICE DA TERMINAL | ON-LINE (DURING SPEECH) | 2009.11.08.12:45 | 1.3.2.3 |
| 01db | UNITED STATES OF AMERICA WASHINGTON BUSINESS OFFICE DB TERMINAL | OFF-LINE | 2009.11.10.12:45 | 1.3.2.4 |
| ... | ... | ... | ... | ... |

FIG.10

DESTINATION LIST MANAGEMENT TABLE

| REQUEST SOURCE TERMINAL ID | DESTINATION TERMINAL ID |
|---|---|
| 01aa | 01ab,⋯,01ba,01bb,⋯,01ca,01cb,01da,01db,⋯ |
| 01ab | 01aa,01ca,01cb |
| 01ba | 01aa,01ab,01ca,01cb,01da,01db |
| ... | ... |
| 01db | 01aa,01ab,01ba,⋯,01da,01ca,01cb⋯,01da |

FIG.11

SESSION MANAGEMENT TABLE

| SELECTION SESSION ID | RELAY DEVICE ID | REQUEST SOURCE TERMINAL ID | DESTINATION TERMINAL ID | DELAY TIME [ms] | DELAY INFORMATION RECEPTION DATE AND TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.12

QUALITY REQUEST MANAGEMENT TABLE

| REQUEST SOURCE IP ADDRESS | REQUEST DESTINATION IP ADDRESS | REQUEST QUALITY |
|---|---|---|
| 1.1.1.1 | 1.1.1.2 | HIGH QUALITY |
| 1.1.1.1 | 1.1.1.3 | NORMAL QUALITY |
| 1.1.1.3 | 1.1.1.1 | NORMAL QUALITY |

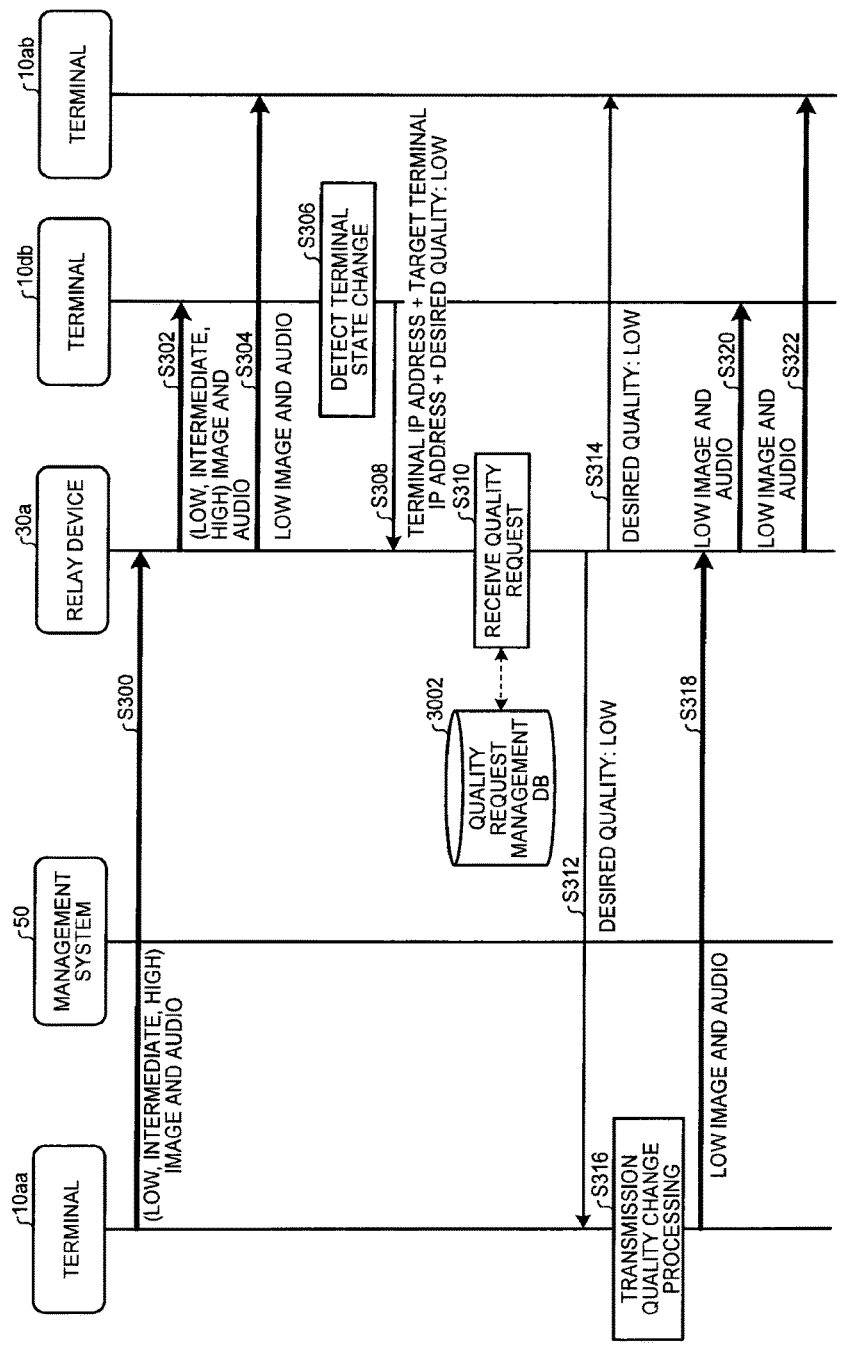

TRANSMISSION SYSTEM, TRANSMISSION TERMINAL, AND TRANSMISSION METHOD

CROSS-REFERENCE TO RELATED APPLICATIONS

The present application claims priority to and incorporates by reference the entire contents of Japanese Patent Application No. 2014-213207 filed in Japan on Oct. 17, 2014.

BACKGROUND OF THE INVENTION

1. Field of the Invention

The present invention relates to a transmission system, a transmission terminal, and a transmission method.

2. Description of the Related Art

Conference systems that hold a remote conference between users at remote places via a communication network such as the Internet have been widely used. With the conference system, in a conference room in which one of parties such as participants that have the remote conference is, images of the conference room including the party and the like in the conference are captured and audio such as remarks thereof is collected using a terminal device of the remote conference system. The conference system converts them to pieces of digital data and transmits the pieces of digital data to a terminal device of the other party. In a conference room of the other party, the images are displayed on a display and the audio is output through a speaker. Thus, a conference between users at remote places can be held in a state close to an actual conference.

Japanese Patent No. 4646668 discloses an image capturing device including a setting unit setting a parameter to be used for motion detection in the following manner. When motion of a subject is detected, video image data is transmitted to the outside at a frame rate higher than that in the case of no motion detected and the video image data that has failed to be transmitted is saved. The parameter to be used for motion detection is set such that when an amount of saved data becomes equal to or larger than a threshold, motion becomes more difficult to be detected than the case where the amount of saved data is smaller than the threshold.

The conventional remote conference systems have been used in such a manner that a plurality of locations are connected for a long period of time and states of the respective locations are shared all the time. That is, pieces of information of the same quality are transmitted and received all the time even when no user pays attention to a target terminal. This usage manner has a problem in that unnecessary load is imposed on a network as a transmission path and a server controlling transmission and reception of these pieces of information.

In view of the above-mentioned circumferences, there is a need to provide a transmission system, a transmission terminal, and a transmission method capable of reducing load of transmission on a network.

SUMMARY OF THE INVENTION

It is an object of the present invention to at least partially solve the problems in the conventional technology.

According to the present invention, there is provided a transmission system transmitting at least one of image data and audio data among a plurality of transmission terminals, wherein a first transmission terminal comprises: a state detector that detects whether or not a user is present around the first transmission terminal; and a controller that controls to transmit correspondence data corresponding to a result detected by the state detector to a second transmission terminal when a state detected by the state detector changes, and the second transmission terminal changes quality of at least one of the image data and the audio data that is transmitted to the first transmission terminal in accordance with the correspondence data and transmits at least one of the image data and the audio data, when the second transmission terminal receives the correspondence data.

The present invention also provides a transmission terminal comprising: a transmitting and receiving unit that transmits and receives at least one of image data and audio data to and from the other transmission terminal, and a transmission quality controller that controls to change quality of at least one of the image data and the audio data that is transmitted by the transmitting and receiving unit to the other transmission terminal in accordance with correspondence data corresponding to a result of detection of change of a state indicating whether or not a user is present around the transmission terminal and transmit at least one of the image data and the audio data, when the transmission terminal receives the correspondence data from the other transmission terminal.

The present invention also provides a transmission method in which at least one of image data and audio data is transmitted among a plurality of transmission terminals, the transmission method comprising: detecting, by a first transmission terminal, whether or not a user is present around the first transmission terminal; and controlling to transmit correspondence data corresponding to a detection result to a second transmission terminal from the first transmission terminal when a detected state changes; and changing quality of at least one of the image data and the audio data that is transmitted to the first transmission terminal from the second transmission terminal in accordance with the correspondence data and transmitting at least one of the image data and the audio data when the second transmission terminal receives the correspondence data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a conceptual diagram illustrating a relay device management table;

FIG. 8 is a conceptual diagram illustrating a terminal authentication management table;

FIG. 9 is a conceptual diagram illustrating a terminal management table;

FIG. 10 is a conceptual diagram illustrating a destination list management table;

FIG. 11 is a conceptual diagram illustrating a session management table;

FIG. 12 is a conceptual diagram illustrating a quality request management table;

FIG. 17 is a diagram illustrating a second notification example of the terminal state change to the transmission terminals.

DETAILED DESCRIPTION OF THE PREFERRED EMBODIMENTS

Figure 1:
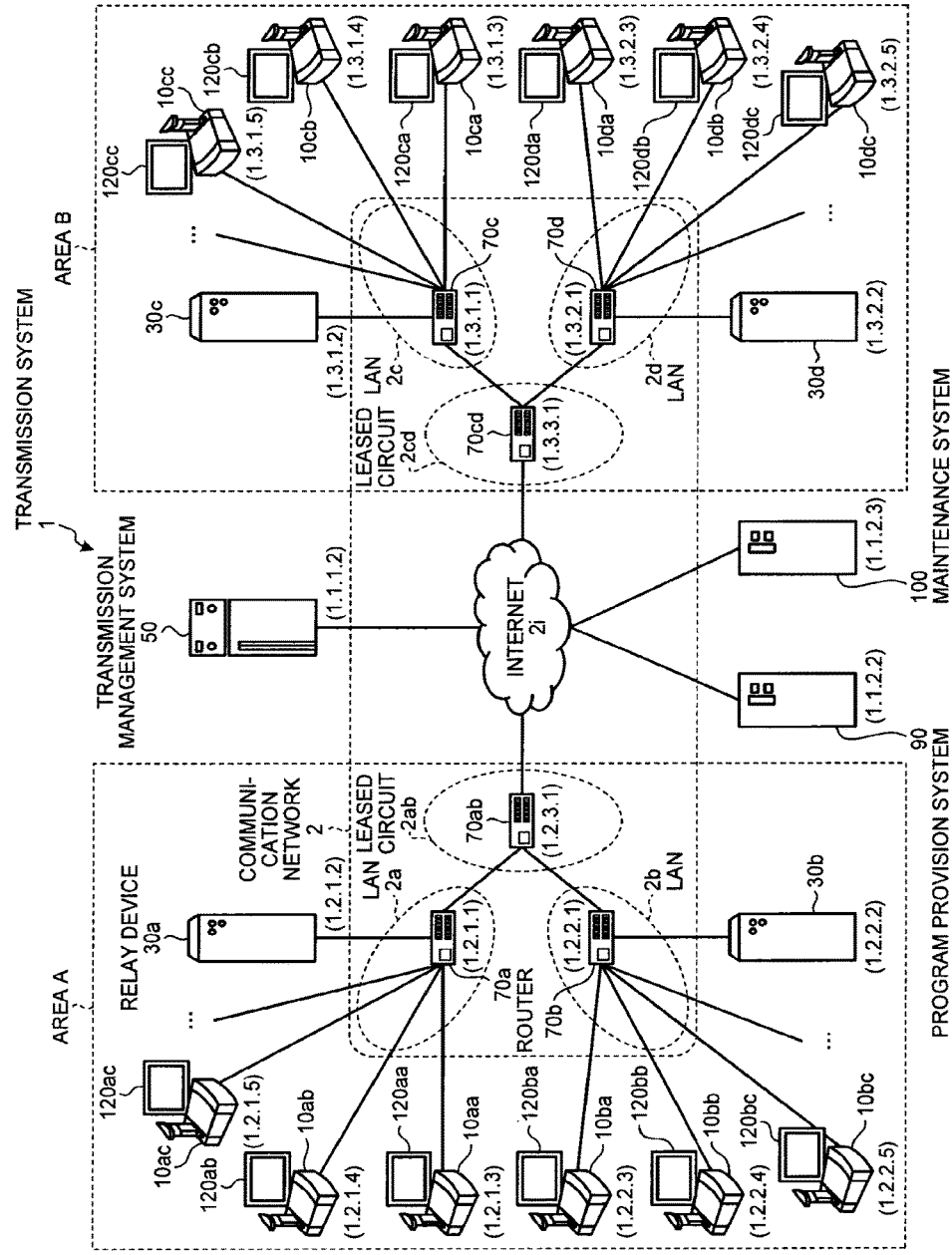
FIG. 1 is a schematic diagram illustrating a transmission system according to a first embodiment of the invention.
Figure 2:
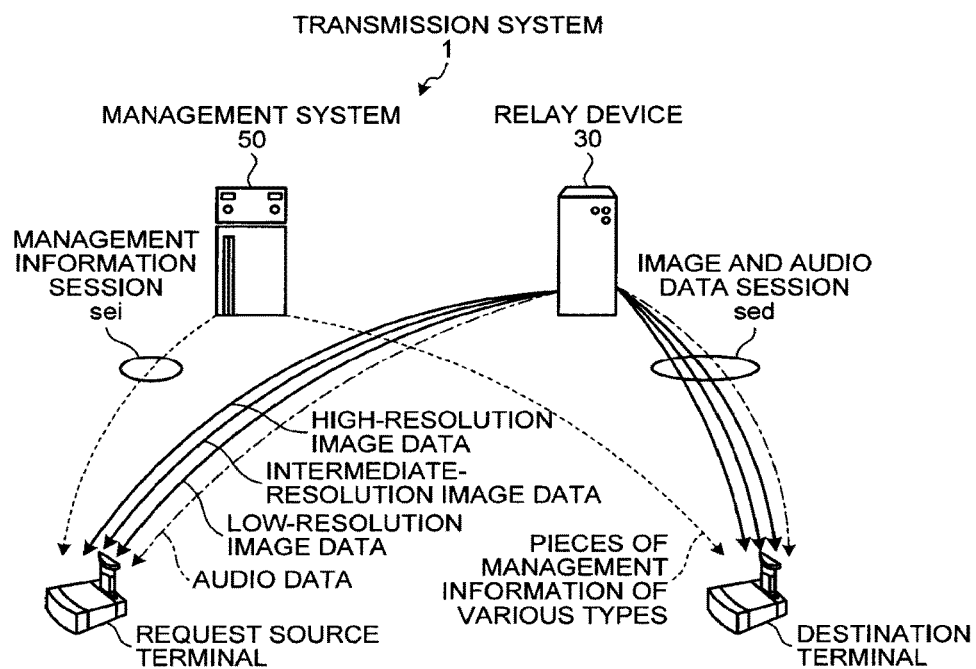
FIG. 2 is a conceptual diagram illustrating states of transmission and reception of pieces of image data, audio data, and pieces of management information of various types in the transmission system.
Figure 3:
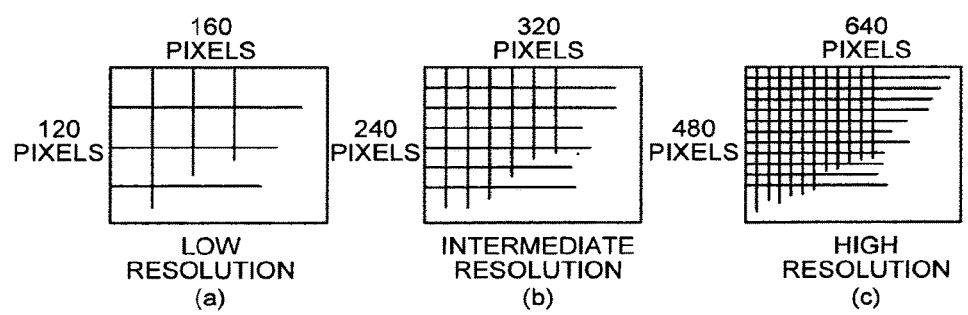
FIG. 3 is conceptual diagram for explaining image quality of the image data.

FIG. 1 is a schematic diagram illustrating a transmission system 1 according to an embodiment of the invention. The transmission system 1 is a transmission system in which at least one of image data and audio data is transmitted among a plurality of transmission terminals. FIG. 2 is a conceptual diagram illustrating states of transmission and reception of pieces of image data, audio data, and pieces of management information of various types in the transmission system. FIG. 3 is conceptual diagram for explaining image quality of the image data.

The transmission system includes a data provision system in which content data is transmitted from one transmission terminal to the other transmission terminal through a transmission management system in one direction and a communication system in which pieces of information, feelings, and the like are transmitted to one another among a plurality of transmission terminals through the transmission management system. The communication system is a system for transmitting the pieces of information, the feelings, and the like to one another among a plurality of communication terminals (corresponding to "transmission terminals") through a communication management system (corresponding to a "transmission management system") and examples thereof include a video conference system and a video phone system.

In the embodiment, the transmission system, the transmission management system, and the transmission terminal will be described while a video conference system is supposed as an example of the communication system, a video conference management system is supposed as an example of the communication management system, and a video conference terminal is supposed as an example of the communication terminal. That is to say, the transmission terminal and the transmission management system in the invention are applied to not only the video conference system but also the communication system or the transmission system.

First, the transmission system 1 as illustrated in FIG. 1 is constructed by a plurality of transmission terminals (10aa, 10ab, . . . ), displays (120aa, 120ab, . . . ) for the respective transmission terminals (10aa, 10ab, . . . ), a plurality of relay devices (30a, 30b, 30c, and 30d), a transmission management system 50, a program provision system 90, and a maintenance system 100.

The terminals 10 transmit and receive image data and audio data as examples of content data.

Hereinafter, the "transmission terminal" is referred to as a "terminal" simply and the "transmission management system" is referred to as a "management system" simply. Any terminal among the terminals (10aa, 10ab, . . . ) is expressed as a "terminal 10", any display among the displays (120aa, 120ab, . . . ) is expressed as a "display 120", and any relay device among the relay devices (30a, 30b, 30c, 30d) is expressed as a "relay device 30". A terminal as a request source requesting start of a video conference is referred to as a "request source terminal". A terminal as a destination (relay destination) corresponding to a request destination is referred to as a "destination terminal".

As illustrated in FIG. 2, in the transmission system 1, a management information session sei in order to transmit and receive pieces of management information of various types is established between the request source terminal and the destination terminal through the management system 50. Four sessions are established between the request source terminal and the destination terminal through the relay device 30 in order to transmit and receive four pieces of data including high-resolution image data, intermediate-resolution image data, low-resolution image data, and audio data. These four sessions are correctively expressed as an image and audio data session sed herein.

Resolution of an image of the image data that is handled in the embodiment is described. There are a low-resolution image as a base image that is formed by 160 pixels in the lateral direction and 120 pixels in the longitudinal direction as illustrated in a section (a) of FIG. 3, an intermediate-resolution image that is formed by 320 pixels in the lateral direction and 240 pixels in the longitudinal direction as illustrated in a section (b) of FIG. 3, and a high-resolution image that is formed by 640 pixels in the lateral direction and 480 pixels in the longitudinal direction as illustrated in a section (c) of FIG. 3. Among them, when the image data passes through a narrow-band path, image data of low image quality that is formed by only the low-resolution image data as the base image is relayed. When the band is relatively large, image data of intermediate image quality that is formed by the low-resolution image data that is the base image and the intermediate-resolution image data is relayed. When the band is extremely large, image data of high image quality that is formed by the low-resolution image data that is the base image, the intermediate-resolution image data, and the high-resolution image data is relayed.

The relay devices 30 as illustrated in FIG. 1 relay the pieces of content data among the terminals 10. The management system 50 authenticates log-in from the terminals 10, manages speech states of the terminals 10, performs management of destination lists and the like, and manages communication states and the like of the relay devices 30, in an integrated manner. The image of the image data may be a moving image or a still image or both of the moving image and the still image.

A plurality of routers (70a, 70b, 70c, 70d, 70ab, and 70cd) select an optimum path of the image data and the audio data. Hereinafter, any router of the routers (70a, 70b, 70c, 70d, 70ab, and 70cd) is expressed as a "router 70".

The program provision system 90 includes a hard disk (HD) 204, which will be described later, stores therein a terminal program for causing the terminals 10 to execute functions of various types (or causing the terminals 10 to function as units of various types), and can transmit the terminal program to the terminals 10. The program provision system 90 also stores in the HD 204 a relay device program for causing the relay devices 30 to execute functions of various types (or causing the relay devices 30 to function as units of various types), and can transmit the relay device program to the relay devices 30. Furthermore, a transmission management program for causing the management system 50 to execute functions of various types (or causing the management system 50 to function as units of various types) is also stored in the HD 204 of the program provision system 90 and the transmission management program can be transmitted to the management system 50.

The maintenance system 100 is a computer that preserves, manages, or conserves at least one of the terminals 10, the relay devices 30, the management system 50, and the program provision system 90. For example, when the maintenance system 100 is installed inside the country and the terminals 10, the relay devices 30, the management system 50, or the program provision system 90 is(are) installed outside the country, the maintenance system 100 performs maintenance such as preservation, management, and conservation of at least one of the terminals 10, the relay devices 30, the management system 50, and the program provision system 90 via the communication network 2 remotely. Furthermore, the maintenance system 100 performs maintenance such as management of a model number, a manufacturing number, a sales destination, conservation and inspection, or failure history of at least one of the terminals 10, the relay devices 30, the management system 50, and the program provision system 90 without going via the communication network 2.

The terminals (10aa, 10ab, 10ac, . . . ), the relay device 30a, and the router 70a are connected to one another with a local area network (LAN) 2a in a communicable manner. The terminals (10ba, 10bb, 10bc, . . . ), the relay device 30b, and the router 70b are connected to one another with a LAN 2b in a communicable manner. Furthermore, the LAN 2a and the LAN 2b are connected through a leased circuit 2ab including the router 70ab in a communicable manner, and are established in a predetermined area A. For example, the area A is Japan, the LAN 2a is established in a business office in Tokyo, and the LAN 2b is established in a business office in Osaka.

The terminals (10ca, 10cb, 10cc, . . . ), the relay device 30c, and the router 70c are connected to one another with a LAN 2a in a communicable manner. The terminal 10d (10da, 10db, 10dc, . . . ), the relay device 30d, and the router 70d are connected to one another with a LAN 2d in a communicable manner. The LAN 2c and the LAN 2d are connected through a leased circuit 2cd including the router 70cd, and are established in a predetermined area B. For example, the area B is the United States of America (USA), the LAN 2c is established in a business office in New York, and the LAN 2d is established in a business office in Washington, D.C. The area A and the area B are connected through an Internet 2i from the corresponding routers (70ab and 70cd) in a communicable manner.

The management system 50 and the program provision system 90 are connected to the terminals 10 and the relay devices 30 through the Internet 2i in a communicable manner. The management system 50 and the program provision system 90 may be installed in the area A or the area B or may be installed in an area other than these areas.

In the embodiment, the LAN 2a, the LAN 2b, the leased circuit tab, the Internet 2i, the leased circuit 2cd, the LAN 2c, and the LAN 2d construct the communication network 2 in the embodiment. The communication network 2 is not limited to be constructed with wired communication and may include a place with which wireless communication by wireless fidelity (WiFi), Bluetooth (registered trademark), or the like is made.

In FIG. 1, a set of four numbers as illustrated below each of the respective terminals 10, the respective relay devices 30, the management system 50, the respective routers 70, and the program provision system 90 indicates an IP address of common IPv4 simply. For example, the IP address of the terminal 10aa is "1.2.1.3". Although IPv6 may be used instead of IPv4, description is made using IPv4 for simplifying the description.

The terminals 10 may be used not only for speech among a plurality of business offices and speech between different rooms in the same business office but also for speech in the same room, speech between outside and inside, and speech between outside and outside. When the terminals 10 are used outside, wireless communication using a mobile phone communication network or the like is performed.

Next, the hardware configuration in the embodiment will be described. In the embodiment, when reception of the image data on the terminal 10 at the destination (relay destination) is relayed, the relay device 30 changes the resolution of an image of the image data, and then, transmits the image data to the terminal 10 at the relay destination.

Figure 4:
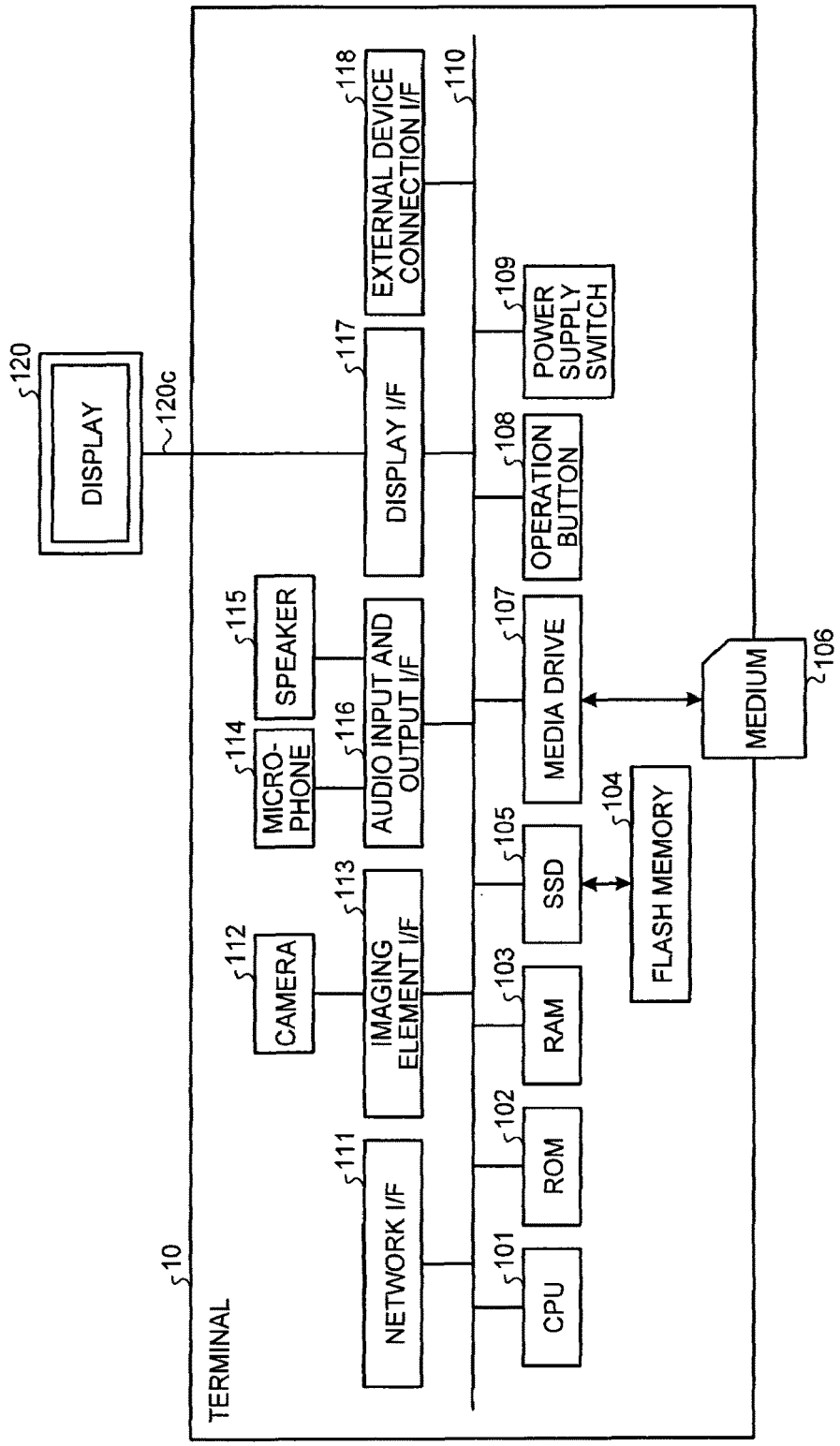
FIG. 4 is a hardware configuration diagram of a terminal in the embodiment.

FIG. 4 is a hardware configuration diagram of the terminal 10 in the embodiment of the invention. As illustrated in FIG. 4, the terminal 10 in the embodiment includes a central processing unit (CPU) 101 controlling operations of the entire terminal 10, a read only memory (ROM) 102 storing therein a program that is used for driving the CPU 101, such as an initial program loader (IPL), a random access memory (RAM) 103 that is used as a work area of the CPU 101, a flash memory 104 storing therein pieces of data of various types such as a terminal program, image data, and audio data, a solid state drive (SSD) 105 controlling reading or writing of pieces of data of various types from or into the flash memory 104 in accordance with control by the CPU 101, a media drive 107 controlling reading or writing (storage) of pieces of data from or into a recording medium 106 such as a flash memory, an operation button 108 that is operated when a destination of the terminal 10 is selected, a power supply switch 109 for switching ON/OFF of a power supply of the terminal 10, and a network interface (I/F) 111 for data transmission via the communication network 2.

The terminal 10 further includes an incorporated camera 112 that image-captures a subject in accordance with control by the CPU 101 so as to provide image data, an imaging element I/F 113 controlling driving of the camera 112, an incorporated microphone 114 inputting audio, an incorporated speaker 115 outputting audio, an audio input and output I/F 116 processing input and output of an audio signal between the microphone 114 and the speaker 115 in accordance with control by the CPU 101, a display I/F 117 transmitting image data to an external display 120 in accordance with control by the CPU 101, an external device connection I/F 118 for connecting external devices of various types, and a bus line 110 such as an address bus and a data bus for electrically connecting the above-mentioned respective components as illustrated in FIG. 4.

The display 120 is a display unit configured by liquid crystal or organic electroluminescence that displays the image of the subject, operation icons, and the like. The display 120 is connected to the display I/F 117 with a cable 120c. The cable 120c may be a cable for an analog RGB (VGA) signal, a cable for a component video, a cable for a high-definition multimedia interface (HDMI) (registered trademark), or a cable for a digital video interactive (DVI) signal.

The camera 112 includes a lens and a solid-state imaging element converting light to electric charges so as to computerize an image (video image) of the subject. A complementary metal oxide semiconductor (CMOS), a charge coupled device (CCD), or the like is used as the solid-state imaging element.

External devices such as an external camera, an external microphone, and an external speaker can be connected to the external device connection I/F 118 with a universal serial bus (USB) cable or the like. When the external camera is connected, the external camera is driven in preference to the incorporated camera 112 in accordance with control by the CPU 101. In the same manner, when the external microphone is connected or when the external speaker is connected, the external microphone or the external speaker is driven in preference to the incorporated microphone 114 or the incorporated speaker 115 in accordance with control by the CPU 101.

The recording medium 106 is configured so as to be detachable from the terminal 10. Furthermore, the flash memory 104 is not limiting and an electrically erasable and programmable ROM (EEPROM) or the like may be used instead as long as it is a non-volatile memory reading or writing pieces of data in accordance with control by the CPU 101.

Furthermore, the above-mentioned terminal program may be recorded in a computer-readable recording medium such as the above-mentioned recording medium 106 so as to be distributed as an installable or executable file. The above-mentioned terminal program may be stored in the ROM 102 instead of the flash memory 104.

Figure 5:
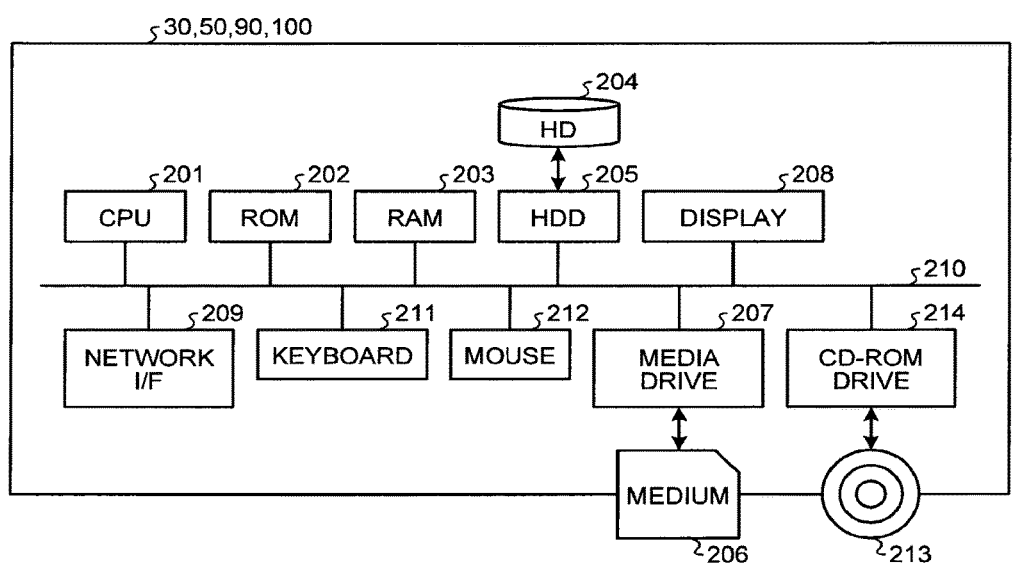
FIG. 5 is a hardware configuration diagram of a management system, a relay device, or a program provision system in the embodiment.

FIG. 5 is a hardware configuration diagram of the management system in the embodiment of the invention. The management system 50 includes a CPU 201 controlling operations of the entire management system 50; a ROM 202 storing therein a program that is used for driving the CPU 201, such as an IPL; a RAM 203 that is used as a work area of the CPU 201; an HD 204 storing therein pieces of data of various types such as the transmission management program; a hard disk drive (HDD) 205 controlling reading or writing of pieces of data of various types from or into the HD 204 in accordance with control by the CPU 201; a media drive 207 controlling reading or writing (storage) of pieces of data from or into a recording medium 206 such as a flash memory; a display 208 displaying pieces of information of various types such as a cursor, a menu, a window, characters, and images; a network I/F 209 for data transmission via the communication network 2; a keyboard 211 including a plurality of keys for inputting characters, numerical values, instructions of various types, and the like; a mouse 212 for selecting or executing various types of instructions, selecting a processing target, moving the cursor, and so on; a compact disc read only memory (CD-ROM) drive 214 controlling reading or writing pieces of data of various types from or into a CD-ROM 213 as an example of a detachable recording medium; and a bus line 210 such as an address bus and a data bus for electrically connecting the above-mentioned respective components as illustrated in FIG. 5.

The above-mentioned transmission management program may be recorded in a computer-readable recording medium such as the above-mentioned recording medium 206 and CD-ROM 213 so as to be distributed as an installable or executable file. The above-mentioned transmission management program may be stored in the ROM 202 instead of the HD 204.

The relay devices 30 have the hardware configuration that is the same as that of the above-mentioned management system 50 and description thereof is omitted. It should be noted that the HD 204 records therein the relay device program for controlling the relay device 30. Also in this case, the relay device program may be recorded in a computer-readable recording medium such as the above-mentioned recording medium 206 and CD-ROM 213 so as to be distributed as an installable or executable file. The above-mentioned relay device program may be stored in the ROM 202 instead of the HD 204.

The program provision system 90 and the maintenance system 100 have the hardware configurations that are the same as that of the above-mentioned management system 50 and description thereof is omitted. It should be noted that the HD 204 records therein the program provision program for controlling the program provision system 90. Also in this case, the program provision program may be recorded in a computer-readable recording medium such as the above-mentioned recording medium 206 and CD-ROM 213 so as to be distributed as an installable or executable file. The above-mentioned program provision program may be stored in the ROM 202 instead of the HD 204.

The programs may be recorded and provided in a computer-readable recording medium such as a compact disc recordable (CD-R), a digital versatile disc (DVD), and a Blu-ray disc as other examples of the above-mentioned detachable recording medium.

Functional Configuration in Embodiment

Figure 6:
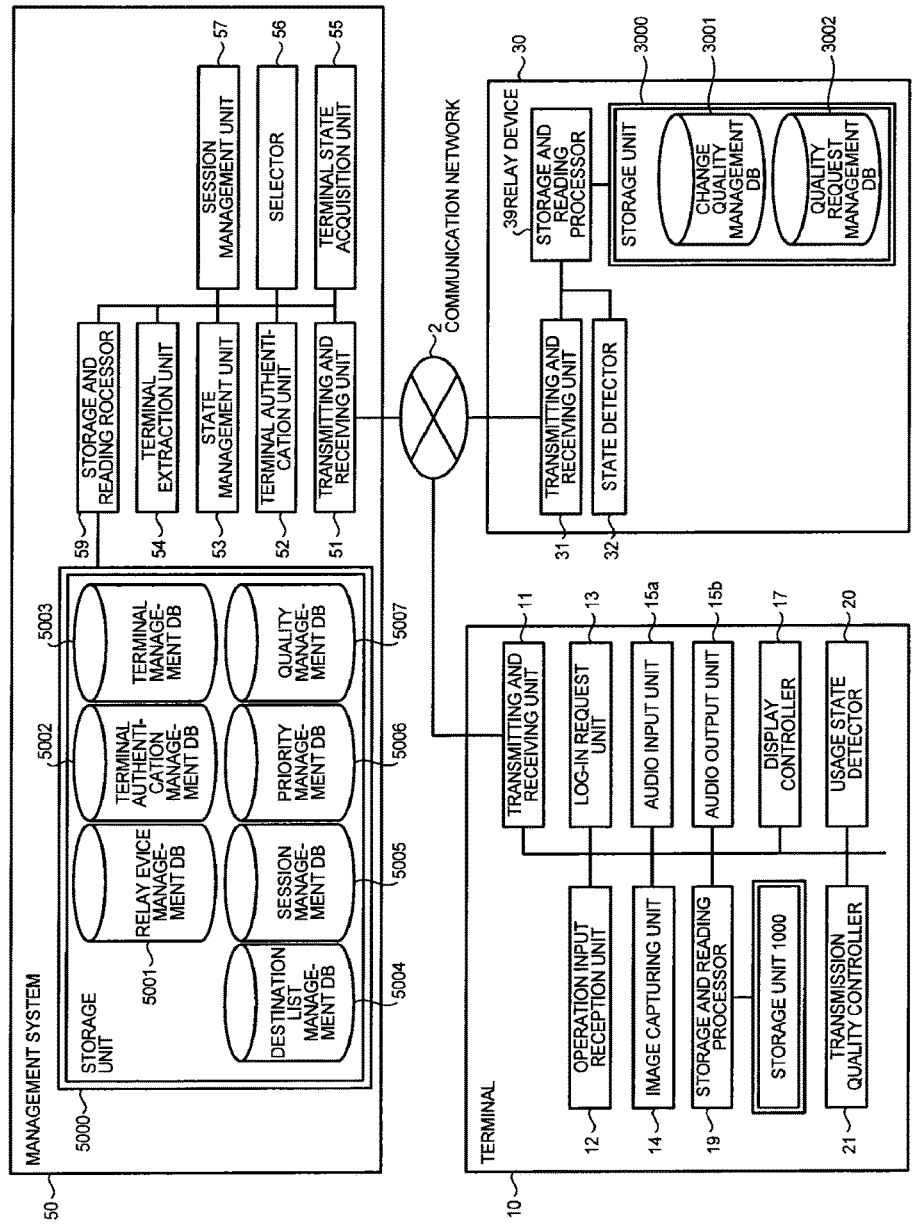
FIG. 6 is a functional block diagram of each terminal, each device, and the system configuring the transmission system in the embodiment.

The functional configuration in the embodiment will be described. FIG. 6 is a functional block diagram of each terminal, each device, and the system that configure the transmission system 1 in the embodiment. In FIG. 6, the terminal 10, the relay device 30, and the management system 50 are connected so as to make data communication with one another via the communication network 2. The program provision system 90 as illustrated in FIG. 1 is not directly related to communication of the video conference and illustration thereof is therefore omitted in FIG. 6.

Functional Configuration of Terminal

The terminal 10 includes a transmitting and receiving unit 11, an operation input reception unit 12, a log-in request unit 13, an image capturing unit 14, an audio input unit 15a, an audio output unit 15b, a display controller 17, and a storage and reading processor 19. These units each are functions or functioning units that are executed when a component illustrated in FIG. 4 operates with instructions from the CPU 101 in accordance with the terminal program loaded on the RAM 103 from the flash memory 104. The terminal 10 includes a storage unit 1000 configured by the RAM 103 as illustrated in FIG. 4 and the flash memory 104 as illustrated in FIG. 4.

Functional Configurations of Terminal

Next, the individual functional configurations of the terminal 10 will be described in detail with reference to FIG. 4 and FIG. 6. Hereinafter, for description of the individual functional configurations of the terminal 10, relations with main components for executing the individual functional configurations of the terminal 10 among the components as illustrated in FIG. 4 are also described.

The transmitting and receiving unit 11 of the terminal 10 as illustrated in FIG. 6 is made to operate with an instruction from the CPU 101 as illustrated in FIG. 4 and by the network I/F 111 as illustrated in FIG. 4, and transmits and receives pieces of data (or information) of various types to and from another terminal, device, or system via the communication network 2. The transmitting and receiving unit 11 starts reception of respective pieces of state information on states of the respective terminals as destination candidates from the management system 50 before starting speech with a desired destination terminal. The pieces of state information indicate not only operation states (on-line or off-line) of the respective terminals 10 but also detail states in the online state, such as a speech available state, a state during speech, and a state where a user leaves his/her seat. Furthermore, the pieces of state information indicate not only the operation states of the respective terminals 10 but also various states including a state where the cable 120c is disconnected from the terminal 10, a state where audio is output and no image is output, and a state (MUTE) where audio is not output. Hereinafter, the case where the pieces of state information indicate the operation states is described as an example.

The operation input reception unit 12 is made to operate with an instruction from the CPU 101 as illustrated in FIG. 4 and by the operation button 108 and the power supply switch 109 as illustrated in FIG. 4, and receives inputs of various types from a user. For example, when the user turns ON the power supply switch 109 as illustrated in FIG. 4, the operation input reception unit 12 as illustrated in FIG. 6 receives the power-ON operation so as to power ON the terminal 10.

The log-in request unit 13 is made to operate with an instruction from the CPU 101 as illustrated in FIG. 4 and automatically transmits log-in request information on a log-in request and the current IP address of a request source terminal to the management system 50 from the transmitting and receiving unit 11 via the communication network 2 with the reception of the power-ON operation. When the user turns OFF the power supply switch 109 from the ON state, the transmitting and receiving unit 11 transmits state information indicating that the terminal 10 is powered OFF to the management system 50, and then, the operation input reception unit 12 powers OFF it completely. With this processing, the management system 50 can grasp that the terminal 10 has been made into the power-OFF state from the power-ON state.

The image capturing unit 14 is made to operate with an instruction from the CPU 101 as illustrated in FIG. 4 and by the camera 112 and the imaging element I/F 113 as illustrated in FIG. 4, image-captures a subject, and outputs image data formed by the image capturing.

The audio input unit 15a is made to operate with an instruction from the CPU 101 as illustrated in FIG. 4 and by the audio input and output I/F 116 as illustrated in FIG. 4, and inputs audio data based on an audio signal formed after audio with the user is converted into the audio signal by the microphone 114. The audio output unit 15b is made to operate with an instruction from the CPU 101 as illustrated in FIG. 4 and by the audio input and output I/F 116 as illustrated in FIG. 4, and outputs an audio signal based on audio data to the speaker so as to cause audio to be output through the speaker 115.

The display controller 17 is made to operate with an instruction from the CPU 101 as illustrated in FIG. 4 and by the display I/F 117 as illustrated in FIG. 4, and combines received pieces of image data having different resolutions as will be described later and controls to transmit the combined image data to the display 120. Furthermore, the display controller 17 transmits information of the destination list received from the management system 50 to the display 120 so as to cause the display 120 to display the destination list.

The storage and reading processor 19 is made to operate with an instruction from the CPU 101 as illustrated in FIG. 4 and by the SSD 105 as illustrated in FIG. 4, and performs pieces of processing of storing pieces of data of various types in the storage unit 1000 and reading the pieces of data of various types stored in the storage unit 1000. A terminal identification (ID), a password, and the like for identifying the terminal 10 are stored in the storage unit 1000. Furthermore, image data and audio data received when the terminal 10 makes speech with the destination terminal are stored and overwritten in the storage unit 1000 every time the image data and the audio data are received. An image is displayed on the display 120 based on the image data before overwritten and audio is output through the speaker 115 based on the audio data before overwritten.

A usage state detector (state detector) 20 detects a state around the terminal 10 and detects whether a user is present therearound. For example, the usage state detector 20 determines whether the user is present around the terminal based on video image data acquired by the image capturing unit 14, audio data acquired by the audio input unit 15a, or data acquired by another device (infrared sensor or the like) connected to the external device connection I/F 118. Then, the terminal 10 transitions to be in a waiting state or an active state in accordance with a detection result by the usage state detector 20.

A transmission quality controller (controller) 21 dynamically controls quality of at least one of video image data and audio data that are transmitted from the terminal (the terminal including the transmission quality controller 21) in accordance with a result of the state transition of the terminal to the waiting state or the active state or a quality change request from another terminal participating in a session. That is to say, when the state detected by the usage state detector 20 changes, the transmission quality controller 21 controls to transmit correspondence data (which will be described later) corresponding to the result detected by the usage state detector 20 to another terminal 10.

Terminal IDs in the embodiment and relay device IDs, which will be described later, indicate pieces of identification information with languages, characters, symbols, marks of various types, or the like, that are used for uniquely identifying the terminals 10 and the relay devices 30. The terminal IDs and the relay device IDs may be pieces of identification information formed by combining at least two of the following: the languages, the characters, the symbols, and the marks of various types as described above.

The relay device 30 includes a transmitting and receiving unit 31, a state detector 32, a data quality checking unit 33, a change quality management unit 34, a data quality changing unit 35, and a storage and reading processor 39. These units each are functions or functioning units that are executed when a component illustrated in FIG. 5 operates with instructions from the CPU 201 in accordance with the relay device program loaded on the RAM 203 from the HD 204. The relay device 30 includes a storage unit 3000 configured by the RAM 203 as illustrated in FIG. 5 and/or the HD 204 as illustrated in FIG. 5.

Quality Request Management Table

The storage unit 3000 includes a quality request management DB 3002 formed by a quality request management table as illustrated in FIG. 12, and records and manages quality requests from the terminals 10 participating in a session that the relay device 30 manages at the current time to another terminals. The quality request management DB 3002 manages the IP addresses of the terminals issuing the quality requests, the IP addresses of request target terminals, and details of the requested quality as illustrated in FIG. 12.

Functional Configurations of Relay Device

Next, the individual functional configurations of the relay device 30 will be described in detail. Hereinafter, for description of the individual functional configurations of the relay device 30, relations with main components for executing the individual functional configurations of the relay device 30 among the components as illustrated in FIG. 5 are also described.

The transmitting and receiving unit 31 of the relay device 30 as illustrated in FIG. 6 is made to operate with an instruction from the CPU 201 as illustrated in FIG. 5 and by the network I/F 209 as illustrated in FIG. 5, and transmits and receives pieces of data (or information) of various types to and from another terminal, device, or system via the communication network 2.

The state detector 32 is made to operate with an instruction from the CPU 201 as illustrated in FIG. 5, and detects an operation state of the relay device 30 including the state detector 32. The operation state includes "on-line", "off-line", "during speech", and "interruption".

The storage and reading processor 39 is made to operate with an instruction from the CPU 201 as illustrated in FIG. 5 and by the HDD 205 as illustrated in FIG. 5, and performs pieces of processing of storing pieces of data of various types in the storage unit 3000 and reading the pieces of data of various types stored in storage unit 3000.

Functional Configuration of Management System

The management system 50 includes a transmitting and receiving unit 51, a terminal authentication unit 52, a state management unit 53, a terminal extraction unit 54, a terminal state acquisition unit 55, a selector 56, a session management unit 57, and a storage and reading processor 59. These units each are functions or functioning units that are executed when a component illustrated in FIG. 5 operates with instructions from the CPU 201 in accordance with the management system program loaded on the RAM 203 from the HD 204. The management system 50 includes a storage unit 5000 configured by the HD 204 as illustrated in FIG. 5.

Relay Device Management Table

A relay device management DB 5001 formed by a relay device management table as illustrated in FIG. 7 is included in the storage unit 3000. In the relay device management table, the IP addresses of the relay devices 30 and maximum data transmission speeds (Mbps) in the relay devices 30 are managed so as to correspond to the respective relay device IDs of the relay devices 30. For example, the relay device management table as illustrated in FIG. 7 indicates that the IP address of the relay device 30*a* the relay device ID of which is "111*a*" is "1.2.1.2" and the maximum data transmission speed in the relay device 30*a* is 100 Mbps.

Terminal Authentication Management Table

Furthermore, a terminal authentication management DB 5002 formed by a terminal authentication management table as illustrated in FIG. 8 is included in the storage unit 5000. In the terminal authentication management table, passwords are managed so as to correspond to the respective terminal IDs of all the terminals 10 that are managed by the management system 50. For example, the terminal authentication management table as illustrated in FIG. 8 indicates that the terminal ID of the terminal 10*aa* is "01*aa*" and the password thereof is "aaaa".

Terminal Management Table

A terminal management DB 5003 formed by a terminal management table as illustrated in FIG. 9 is included in the storage unit 5000. In the terminal management table, destination names when the respective terminals 10 are set to the destinations, the operation states of the respective terminals 10, reception date and time at which the management system 50 has received the log-in request information, which will be described later, and the IP addresses of the terminals 10 are managed so as to correspond to the terminal IDs of the respective terminals 10. For example, the terminal management table as illustrated in FIG. 9 indicates that the terminal name of the terminal 10*aa* the terminal ID of which is "01*aa*" is "Japan Tokyo business office AA terminal", the operation state thereof is "on-line (speech available)", the reception date and time at which the management system 50 has received the log-in request information is "Nov. 10, 2009, 13:40", and the IP address of the terminal 10*aa* is "1.2.1.3".

Destination List Management Table

A destination list management DB 5004 formed by a destination list management table as illustrated in FIG. 10 is included in the storage unit 5000. In the destination list management table, all the terminal IDs of destination terminals registered as candidates of a destination terminal are managed so as to correspond to the terminal IDs of request source terminals issuing a request for start of speech in the video conference. For example, the destination list management table as illustrated in FIG. 10 indicates that candidates of the destination terminal (terminal 10*db*) to which the request source terminal (terminal 10*aa*) the terminal ID of which is "01*aa*" can issue the request for the start of speech in the video conference are the terminal 10*ab* the terminal ID of which is "01*ab*", the terminal 10*ba* the terminal ID of which is "01*ba*", the terminal 10*bb* the terminal ID of which is "01*bb*", and the like. The candidates of the destination terminal are updated by being added or deleted based on a request for addition or deletion that any request source terminal issues to the management system 50.

Session Management Table

A session management DB 5005 formed by a session management table as illustrated in FIG. 11 is included in the storage unit 5000. In the session management table, the relay device IDs of the relay devices that are used to relay the image data and the audio data, the terminal IDs of the request source terminals, and the terminal IDs of the destination terminals are managed so as to correspond to respective session IDs for identifying sessions through the selected relay devices 30. For example, the session management table as illustrated in FIG. 11 indicates that a session identified by a session ID "se1" is established between the request source terminal (terminal 10*aa*) the terminal ID of which is "01*aa*" and the destination terminal (terminal 10*db*) the terminal ID of which is "01*db*" through the relay device 30*a* (relay device ID "111*a*"), and is used to relay the image data and the audio data.

Functional Configurations of Management System

Next, the individual functional configurations of the management system 50 will be described in detail. Hereinafter, for description of the individual functional configurations of the management system 50, relations with main components for executing the individual functional configurations of the management system 50 among the components as illustrated in FIG. 5 are also described.

The transmitting and receiving unit 51 is made to operate with an instruction from the CPU 201 as illustrated in FIG. 5 and by the network I/F 209 as illustrated in FIG. 5, and transmits and receives pieces of data (or information) of various types to and from another terminal, device, or system via the communication network 2.

The terminal authentication unit 52 is made to operate with an instruction from the CPU 201 as illustrated in FIG. 5, and searches the terminal authentication management DB 5002 in the storage unit 5000 using the terminal ID and the password, contained in the log-in request information received through the transmitting and receiving unit 51, as search keys and determines whether the same terminal ID and password are managed in the terminal authentication management DB 5002 so as to perform terminal authentication.

The state management unit 53 is made to operate with an instruction from the CPU 201 as illustrated in FIG. 5, and stores and manages, in the terminal management DB 5003 (see FIG. 9), the terminal ID of the request source terminal that has issued the log-in request, the operation state of the request source terminal, the reception date and time at which the management system 50 has received the log-in request information, and the IP address of the request source terminal in a correspondence manner in order to manage the operation state of the request source terminal. When the user turns OFF the power supply switch 109 of the terminal 10 from the ON state, the state management unit 53 changes the operation state from on-line to off-line in the terminal management DB 5003 (see FIG. 9) based on the state information on power-OFF of the terminal 10 that is transmitted from the terminal 10.

The terminal extraction unit 54 is made to operate with an instruction from the CPU 201 as illustrated in FIG. 5, and searches the destination list management DB 5004 (see FIG. 10) using, as a key, the terminal ID of the request source terminal that has issued the log-in request, and reads the terminal IDs of the candidates of the destination terminal capable of making speech with the request source terminal so as to extract the terminal IDs. Furthermore, the terminal extraction unit 54 searches the destination list management DB 5004 (see FIG. 10) using, as a key, the terminal ID of the request source terminal that has issued the log-in request, and also extracts the terminal IDs of other request source terminals for which the terminal ID of the above-mentioned request source terminal is registered as a candidate of the destination terminal.

The terminal state acquisition unit 55 is made to operate with an instruction from the CPU 201 as illustrated in FIG. 5, and searches the terminal management DB 5003 (see FIG. 9) using, as search keys, the terminal IDs of the candidates of the destination terminal that have been extracted by the above-mentioned terminal extraction unit 54, and reads the operation states of the respective terminals ID extracted by the above-mentioned terminal extraction unit 54. This processing enables the terminal state acquisition unit 55 to acquire the operation states of the candidates of the destination terminal capable of making speech with the request source terminal that has issued the log-in request. In addition, the terminal state acquisition unit 55 searches the terminal management DB 5003 using the terminal IDs, extracted by the above-mentioned terminal extraction unit 54, as search keys and acquires the operation states of the request source terminals that have issued the log-in requests.

The selector 56 is made to operate with an instruction from the CPU 201 as illustrated in FIG. 5, and performs processing of selecting one relay device 30 from the relay devices 30.

The session management unit 57 is made to operate with an instruction from the CPU 201 as illustrated in FIG. 5, and stores and manages, in the session management DB 5005 (see FIG. 11) in the storage unit 5000, the session ID generated for identifying the session, the terminal ID of the request source terminal, and the terminal ID of the destination terminal in a correspondence manner. Furthermore, the session management unit 57 stores and manages, in the session management DB 5005 (see FIG. 11), the relay device ID of the relay device 30 selected by the selector 56 for each session ID.

The storage and reading processor 59 is made to operate with an instruction from the CPU 201 as illustrated in FIG. 5 and the HDD 205 as illustrated in FIG. 5, and performs pieces of processing of storing pieces of data of various types in the storage unit 5000 and reading the pieces of data of various types stored in the storage unit 5000.

Processing or Operation in the Embodiment

Figure 13:
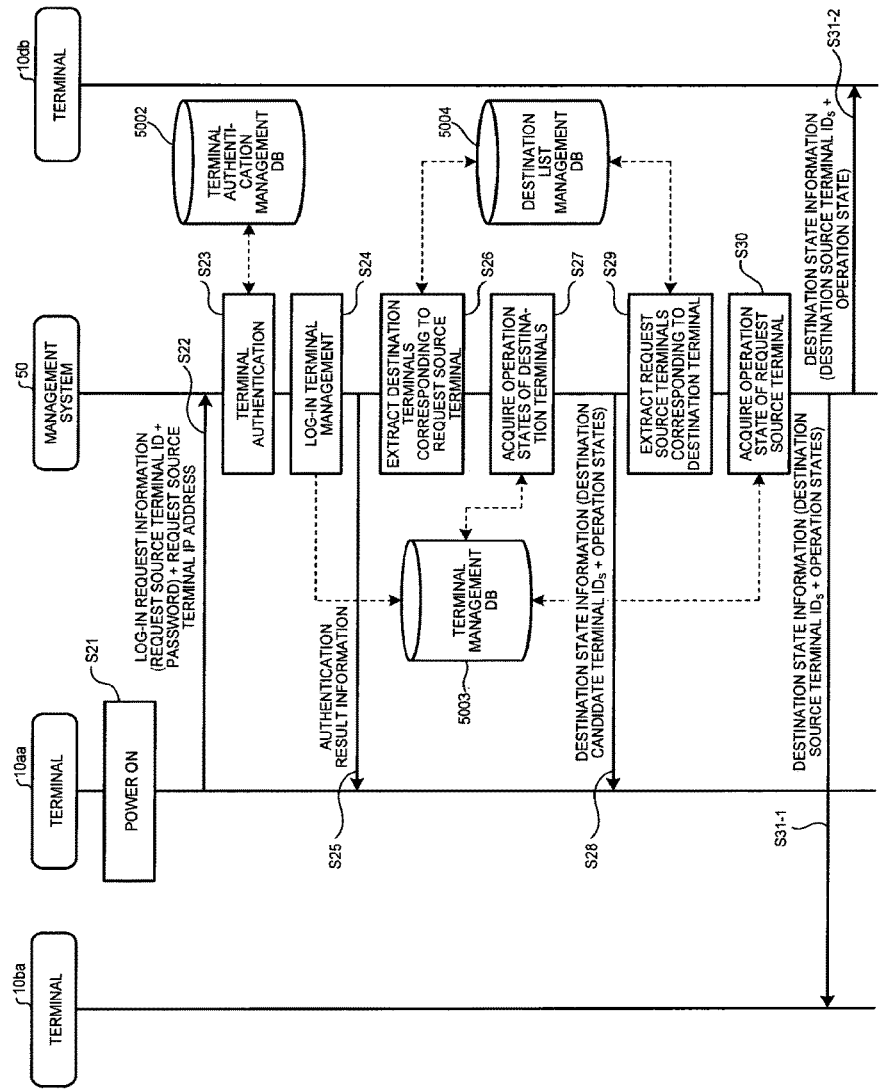
FIG. 13 is a sequence diagram illustrating processing at a preparation stage for start of remote communication among terminals.
Figure 14:
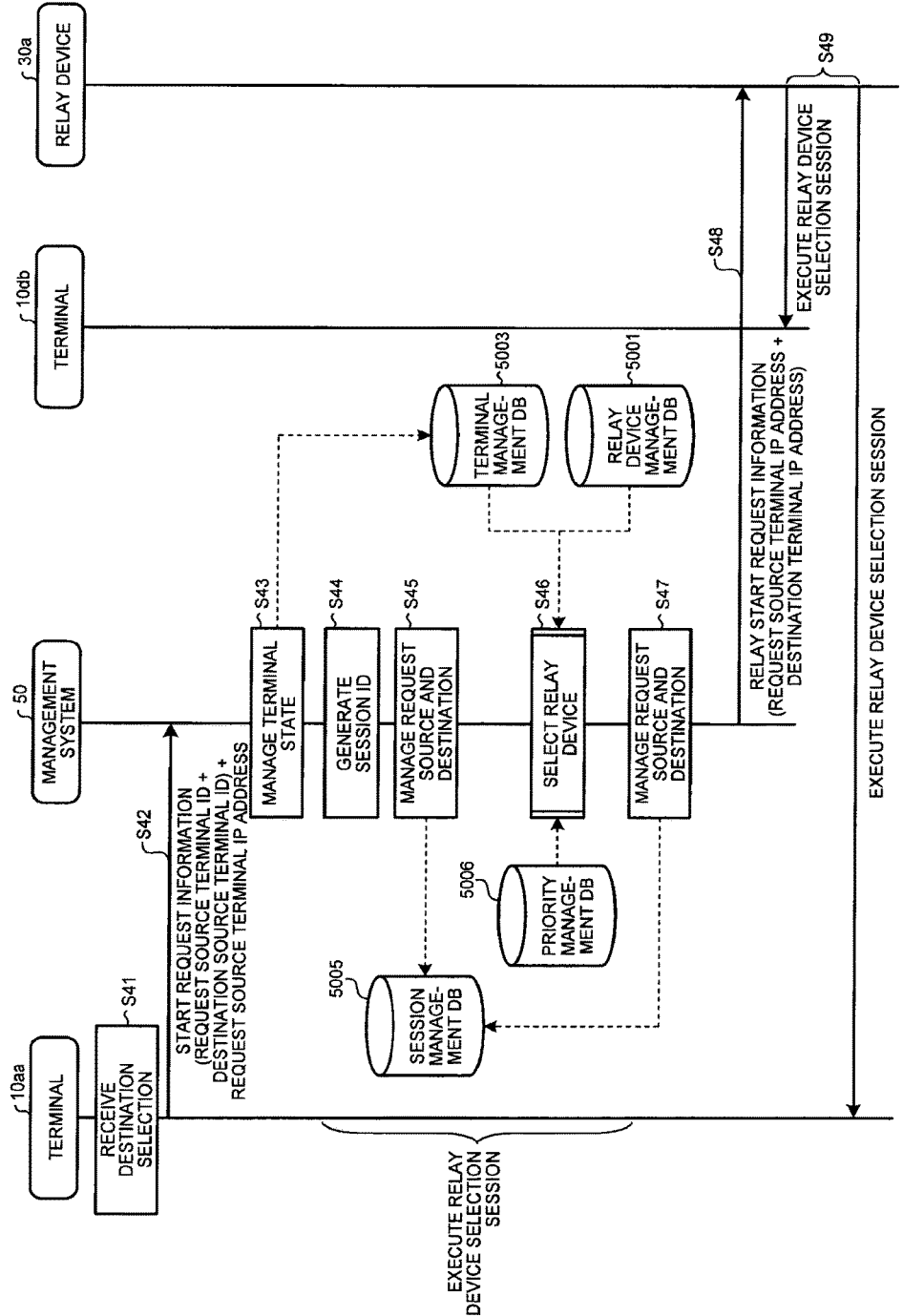
FIG. 14 is a sequence diagram illustrating processing of transmitting and receiving the pieces of image data and the audio data between the transmission terminals.

Next, a processing method in the transmission system 1 in the embodiment will be described. FIG. 13 is a sequence diagram illustrating processing at a preparation stage for start of speech among the terminals 10. FIG. 14 is a sequence diagram illustrating processing of transmitting and receiving pieces of image data and audio data between the terminals.

Then, processing of transmitting and receiving respective pieces of management information between the terminal 10aa and the terminal 10db at the preparation stage before speech is started will be described with reference to FIG. 13. In FIG. 13, all the pieces of management information of various types are transmitted and received by the management information session sei as illustrated in FIG. 2.

First, when the user turns ON the power supply switch 109 as illustrated in FIG. 4, the operation input reception unit 12 as illustrated in FIG. 6 receives the power-ON operation so as to power ON the terminal 10aa (step S21: step S21). Then, the log-in request unit 13 automatically transmits log-in request information on a log-in request to the management system 50 from the transmitting and receiving unit 11 via the communication network 2 with the reception of the power-ON operation (step S22). The log-in request information contains the terminal ID and the password for identifying the terminal 10aa that is the request source including the log-in request unit 13. The terminal ID and the password are pieces of data read from the storage unit 1000 and transmitted to the transmitting and receiving unit 11 through the storage and reading processor 19. When the terminal 10aa transmits the log-in request information to the management system 50, the management system 50 at the reception side can grasp the IP address of the terminal 10aa at the transmission side.

Subsequently, the terminal authentication unit 52 of the management system 50 searches the terminal authentication management DB 5002 (see FIG. 8) in the storage unit 5000 using the terminal ID and the password, contained in the log-in request information received through the transmitting and receiving unit 51, as search keys and determines whether the same terminal ID and password are managed in the terminal authentication management DB 5002 so as to perform the terminal authentication (step S23). When the terminal authentication unit 52 determines that the log-in request is a log-in request from the terminal 10 having valid utilization authority because the same terminal ID and password are managed, the state management unit 53 stores, in the terminal management DB 5003 (see FIG. 9), the terminal ID of the terminal 10aa, the operation state thereof, the reception date and time at which the above-mentioned log-in request information has been received, and the IP address of the terminal 10aa in a correspondence manner (step S24). With this storage, in the terminal management table as illustrated in FIG. 9, the operation state "on-line", the reception date and time "2009.11.10.13:40", and the IP address "1.2.1.3" of the terminal 10aa are managed so as to correspond to the terminal ID "01aa".

Thereafter, the transmitting and receiving unit 51 of the management system 50 transmits authentication result information on an authentication result provided by the above-mentioned terminal authentication unit 52 to the request source terminal (terminal 10aa) that has issued the log-in request via the communication network 2 (step S25). In the embodiment, the following description is made for the case where the terminal authentication unit 52 determines that the terminal has the valid utilization authority.

The terminal extraction unit 54 of the management system 50 searches the destination list management DB 5004 (see FIG. 10) using, as a search key, the terminal ID "01aa" of the request source terminal (terminal 10aa) that has issued the log-in request, and reads and extracts the terminal IDs of candidates of the destination terminal capable of making speech with the request source terminal (terminal 10aa) (step S26). In this example, the terminal IDs ("01ab", "01ba", and "01db") of the destination terminals (terminals 10ab, 10ba, and 10db) corresponding to the terminal ID "01aa" of the request source terminal (terminal 10aa) are extracted.

Thereafter, the terminal state acquisition unit 55 searches the terminal management DB 5003 (see FIG. 9) using, as search keys, the terminal IDs ("01ab", "01ba", and "01db") of the candidates of the destination terminal that have been extracted by the above-mentioned terminal extraction unit 54, and reads the operation states ("off-line", "on-line", and "on-line") for the respective terminals ID extracted by the above-mentioned terminal extraction unit 54 so as to acquire the operation states of the respective terminals (10ab, 10ba, and 10db) (step S27).

Then, the transmitting and receiving unit 51 transmits destination state information containing the terminal IDs ("01ab", "01ba", and "01db") as the search keys used at step S27 and the respective operation states ("off-line", "on-line", and "on-line") of the corresponding destination terminals (terminals 10ab, 10ba, and 10db) to the request source terminal (terminal 10aa) via the communication network 2 (step S28). The request source terminal (terminal 10aa) can therefore grasp the respective current operation states ("off-line", "on-line", and "on-line") of the terminals (terminals 10ab, 10ba, and 10db) that are the candidates of the destination terminal capable of communicating with the request source terminal (terminal 10aa).

Furthermore, the terminal extraction unit 54 of the management system 50 searches the destination list management DB 5004 (see FIG. 10) using, as a search key, the terminal ID "01aa" of the request source terminal that has issued the log-in request, and extracts the terminal IDs of other request source terminals for which the terminal ID "01aa" of the above-mentioned request source terminal (terminal 10aa) is registered as the candidate of the destination terminal (step S29). In the destination list management table as illustrated in FIG. 10, the terminal IDs of the other request source terminals that are extracted are "01ab", "01ba", and "01db".

Then, the terminal state acquisition unit 55 of the management system 50 searches the terminal management DB 5003 (see FIG. 9) using, as a search key, the terminal ID "01aa" of the request source terminal (terminal 10aa) that has issued the log-in request, and acquires the operation state of the request source terminal (terminal 10aa) that has issued the log-in request (step S30).

Thereafter, the transmitting and receiving unit 51 transmits destination state information containing the terminal ID "01aa" of the request source terminal (terminal 10aa) and the operation state "on-line" acquired at step S30 to the terminals (10ba and 10db) the operation states of which are "on-line" in the terminal management DB 5003 (see FIG. 9) among the terminals (10ab, 10ba, and 10db) corresponding to the terminal IDs ("01ab", "01ba", and "01db") extracted at step S29 (step S31-1 and 31-2). When the transmitting and receiving unit 51 transmits the destination state information to the terminals (10ba and 10db), it refers to the IP addresses of the terminals that are managed in the terminal management table as illustrated in FIG. 9 based on the respective terminal IDs ("01ba" and "01db"). With this processing, the terminal ID "01aa" of the above-mentioned request source terminal (terminal 10aa) that has issued the log-in request and the operation state "on-line" thereof can be transmitted to the respective other destination terminals (terminal 10db and 10ba) capable of communicating with, as a destination, the request source terminal (terminal 10aa) that has issued the log-in request.

Also in the other terminals 10, when the user turns ON the power supply switch 109 as illustrated in FIG. 5 in the same manner as the processing at step S21, the operation input reception unit 12 as illustrated in FIG. 6 receives the power-ON operation and performs the same pieces of processing as those at step S22 to step S31-1 and step S31-2 and description thereof is therefore omitted.

Subsequently, processing of transmitting and receiving the image data and the audio data through the relay device in order to have speech in the video conference between the request source terminal and the destination terminal will be described with reference to FIG. 6 and FIG. 14. One-direction processing of transmitting the image data and the audio data to the terminal 10db from the terminal 10aa and opposite-direction processing of transmitting the image data and the audio data to the terminal 10aa from the terminal 10db are the same in transmission and reception and the like of the image data and the audio data. For this reason, the above-mentioned one-direction communication is described and the above-mentioned opposite-direction communication is omitted.

In FIG. 14, all the pieces of management information of various types are transmitted and received by the management information session sei as illustrated in FIG. 2. In the embodiment, the request source terminal (terminal 10aa) can make speech with at least one of the terminals (10ba and 10db) the operation states of which are on-line based on the pieces of state information of the terminals received at step S31 among the terminals 10 as the candidates of the destination. The case where the user of the request source terminal (terminal 10aa) selects to start speech with the destination terminal (terminal 10db) will be described as follows.

First, when the user pushes the operation button 108 as illustrated in FIG. 4 and selects the terminal 10db, the operation input reception unit 12 as illustrated in FIG. 6 receives a request for start of speech with the destination terminal (terminal 10db) (step S41). Then, the transmitting and receiving unit 11 of the request source terminal (terminal 10aa) transmits start request information containing the terminal ID "01aa" of the terminal 10aa and the terminal ID "01db" of the destination terminal (terminal 10db) and indicating that it desires to start speech to the management system 50 (step S42). The transmitting and receiving unit 51 of the management system 50 therefore receives the above-mentioned start request information and can grasp the IP address "1.2.1.3" of the request source terminal (terminal 10aa) as the transmission source.

Then, the state management unit 53 changes both field portions of the operations states in records containing the terminal ID "01*aa*" and the terminal ID "01*db*" to "during speech" in the terminal management table of the terminal management DB 5003 (see FIG. 9) based on the terminal ID "01*aa*" of the request source terminal (terminal 10*aa*) and the terminal ID "01*db*" of the destination terminal (terminal 10*db*) that are contained in the start request information (step S43). In this state, the request source terminal (terminal 10*aa*) and the destination terminal (terminal 10*db*) do not start speech and are made into the during-speech states. When another terminal 10 tries to make speech with the request source terminal (terminal 10*aa*) or the destination terminal (terminal 10*db*), notification sound or display indicating the what-is-called during-speech state is output.

Then, processing of selecting the relay device 30 and establishing a session between the terminals through the selected relay device is described. First, the session management unit generates a session ID for identifying the session that is established through the relay device 30 (step S44).

The session management unit 57 stores and manages, in the session management DB 5005 (see FIG. 11) in the storage unit 5000, a session ID "se1" generated at step S44, the terminal ID "01*aa*" of the request source terminal (terminal 10*aa*), and the terminal ID "01*db*" of the destination terminal (terminal 10*db*) in a correspondence manner (step S45).

The selector selects any one relay device ID from the relay devices 30 that are managed in the relay device management DB 5001 (see FIG. 7) so as to execute selection of the relay device 30 (step S46). The selection of the relay device may be made based on the IP address and the maximum data transmission speed of the relay device.

The session management unit 57 of the management system 50 stores and manages, in the session management table of the session management DB 5005 (see FIG. 11), the relay device ID "111*a*" of the above-mentioned selected relay device 30*a* in a field portion of the relay device ID in a record containing the session ID "se1" (step S47).

Then, the transmitting and receiving unit 51 of the management system 50 transmits relay start request information on a request for start of relay to the relay device 30*a* via the communication network 2 (step S48). The relay start request information contains the respective IP addresses ("1.2.1.3" and "1.3.2.4") of the request source terminal (terminal 10*aa*) and the destination terminal (terminal 10*db*) that are relayed. With this transmission, the relay device 30*a* can recognize that the relay device 30*a* has been selected, so that the relay device 30*a* establishes a session for transferring three pieces of image data including low-resolution image data, intermediate-resolution image data, and high-resolution image data and audio data to both of the terminals (10*aa* and 10*db*) (step S49). The establishment of the session enables the terminals (10*aa* and 10*db*) to start speech in the video conference.

Next, an example of operations of the transmission system 1 will be described with reference to FIG. 15. First, the terminal 10 checks its current state (which has been already established) (step S100). When the checked state of the terminal 10 is a "waiting state" (Yes at step S100), the terminal 10 proceeds to terminal state determination processing at step S102. In the processing at step S102, the terminal 10 determines whether a user is present therearound using a connected device, for example. Details thereof will be described later.

At step S104, the terminal 10 checks a result of the terminal state determination processing. When the determination result indicates the "waiting state" (No at step S104), the terminal 10 finishes the processing as it is because the current state does not change. When the determination result indicates an "active state" (Yes at step S104), the terminal 10 records the current time (time at which the state has transitioned to the active state) T1 in processing at step S106 and records the transition of the current state to the "active state" in processing at step S108.

Thereafter, the terminal 10 performs transmission quality change processing in processing at step S116. In this case, the terminal 10 performs processing of improving quality of streams such as a video image and audio that are transmitted to the session in which the terminal 10 participates. This processing makes participants of other terminals to easily grasp the state of the terminal 10. Details thereof will be described later.

Thereafter, the terminal 10 may issue, to the relay device 30*a*, a request for improvement in quality of video images that are transmitted from respective locations and received (displayed on a screen) by the terminal 10 in processing at step S118. Actually, the control to change the quality of the streams that the terminal 10 transmits in the processing at step S116 and the request for change in the quality of the streams that the terminal 10 receives in the processing at step S118 are independent of each other. The terminal 10 may perform both or any one of the pieces of processing. The processing at step S118 will be described in detail with reference to FIG. 16.

When the current terminal state is the "active state" in the processing at step S100 (No at step S100), the terminal 10 first determines whether at least a certain period of time (Tth) has passed from the time (T1) at which the terminal 10 has transitioned to be in the active state to the current time (step S110). After the terminal 10 once turns into the active state, the terminal 10 keeps the active state for Tth at minimum so as to prevent the terminal 10 from transitioning between a high-quality state and a low-quality state excessively frequently. Tth may be optionally determined depending on applications that are used actually.

When the terminal 10 determines that Tth has not passed from the time at which the terminal 10 has transitioned to be in the active state to the current time (No at step S110), the terminal 10 finishes the processing as it is so as to keep the active state. When the terminal 10 determines that a period of time that is equal to or longer than Tth has passed (Yes at step S110), the terminal 10 performs terminal state determination processing that is the same as that at step S102 in processing at step S112.

The terminal 10 determines a result of the determination processing at step S112 in processing at step S114. When the determination result indicates the "active state" (No at 114) and the current state does not change, the terminal 10 finishes the processing as it is. When the determination result indicates the "waiting state" (Yes at step S114), the terminal 10 records the change to the waiting state in processing at step S108 and performs the transmission quality change processing in the processing at step S116. In this case, the terminal 10 performs processing of lowering quality of the streams such as the video image and the audio that the terminal 10 transmits to the session.

Thereafter, when the terminal 10 has issued, to the relay device 30*a*, the request for improvement in the quality at the time of the transition to the active state, the terminal 10 issues a request for lowering in the quality and cancels the previous request.

The terminal 10 executes the above-mentioned pieces of processing periodically at each of terminals so as to detect usage states of the terminals. Furthermore, the terminal 10 changes the quality of the streams that the terminal 10 transmits or dynamically issues a request for change in the quality of the streams that are transmitted from other locations and received by the terminal 10 based on the detection result. Thus, the terminal 10 controls the quality in accordance with the terminal states appropriately.

In the above-mentioned description, as for the quality change request in the processing at step S118, the terminal 10 issues the request for change in the quality to each of all the locations from which the terminal 10 receives the streams. In this case, not all the streams but a partial stream can be made to be selected by proposing a list of the locations participating in the current session to the user of the terminal 10 so as to enable the user to optionally select a location for which the user desires to change the quality to high quality.

Figure 15:
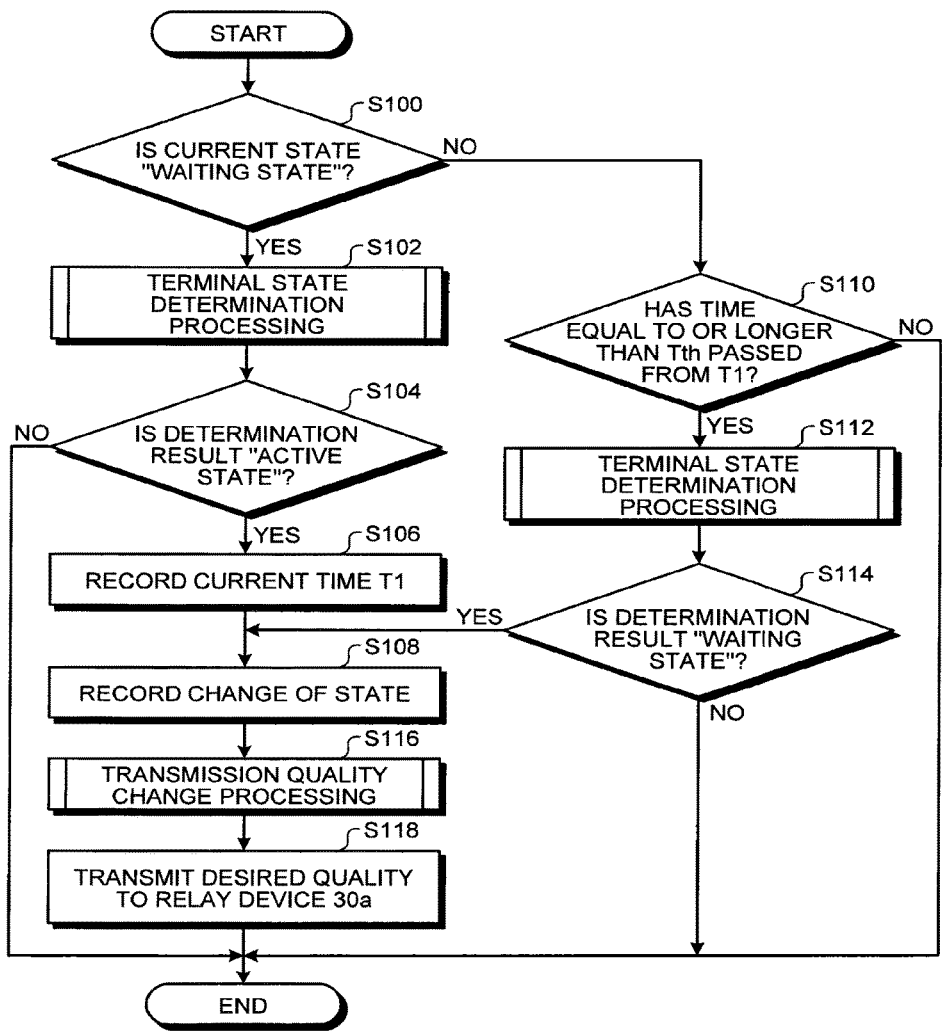
FIG. 15 is a flowchart illustrating an operation example of the transmission system.

Next, details of the terminal state determination processing (step S102) as illustrated in FIG. 15 will be described. The terminal 10 detects whether a user is present around each terminal. As a result, when the user is detected to be present, the terminal is determined to be in the active state whereas when the user is detected to be absent, the terminal is determined to be in the waiting state. Although some examples of the detail detection method will be described as follows, the method is not limited to them in a range without departing from the scope of the invention. Alternatively, the terminal 10 may determine that the terminal is in the active state only when a plurality of detection methods are executed and the presence of the user is detected with equal to or more than the predetermined number of methods in order to improve accuracy of the detection.

The usage state detector 20 performs detection based on the video image acquired by the image capturing unit 14, for example. To be specific, the usage state detector 20 detects a change amount between frames for the respective frames of the video image acquired by the image capturing unit 14 in order to determine whether there are people in a range shot by the image capturing unit 14. For example, every time the image capturing unit 14 acquires a new frame, the usage state detector 20 calculates a difference between the frame and the previously acquired frame for respective pixels and determines that a person is present around the terminal when the difference exceeds a certain threshold.

The usage state detector 20 performs face detection processing for the respective frames of the video image acquired by the image capturing unit 14, for example, in order to determine whether a user trying to use the terminal (looking into a camera, paying attention to a display device connected to the terminal, and so on) is present in front of the terminal. For example, every time the image capturing unit 14 acquires a new frame, the usage state detector 20 performs the face detection processing on the frame. As a result, the usage state detector 20 determines that the user of the terminal is present when a region extracted as a face portion exceeds a certain size.

The usage state detector 20 may perform detection based on audio data acquired by the audio input unit 15. To be specific, the usage state detector 20 performs volume detection processing on each piece of audio data that has been acquired by the audio input unit 15 for a certain period of time. This processing is performed in order to determine whether a user is present around the terminal and the user calls another location displayed on the display device connected to the terminal. For example, the usage state detector 20 determines whether the user is present based on whether the audio data that has been acquired by the audio input unit 15 for the certain period of time contains such portion that exceeds a certain amount of volume by at least a certain ratio.

The usage state detector 20 may be configured to make determination using an external device connected to the external device connection I/F 118. For example, the usage state detector 20 checks output of an infrared sensor connected to the external device connection I/F 118. This determination is made in order to determine whether a user is present in front of the terminal. For example, the usage state detector 20 can determine that the user of the terminal is present when the infrared sensor is installed in front of the terminal and a continuous period of time during which the infrared sensor detects presence of an object or a person is equal to or longer than a predetermined period of time.

The usage state detector 20 may change the state of the terminal 10 including the usage state detector 20 in accordance with presence or absence of an operation by the terminal user.

Next, the transmission quality change processing (step S116) as illustrated in FIG. 15 will be described in detail. The transmission quality controller 21 performs quality control of media streams such as the video image and the audio that are transmitted from the terminal 10. Although a detail example is described for each of the video image and the audio below but the quality control is not limited thereto in a range without departing from the scope of the invention.

When the transmission quality controller 21 controls to change the quality of the video image, it changes a resolution or changes a frame rate thereof. When the transmission quality controller 21 changes the resolution, for example, it changes the resolution of the video image that is transmitted from the terminal 10 including the transmission quality controller 21. For example, a resolution corresponding to each of high quality and low quality is previously set, the terminal 10 controls the image capturing unit 14 so as to acquire the video image at the resolution in accordance with determined quality. In this case, the transmission quality controller 21 changes the resolution of the video image that is acquired from the device and the resolution is therefore changed independently of a codec. When an SVC codec is used, quality with a determined maximum resolution that is output from an encoder is provided and pieces of data at resolutions lowered hierarchically from the resolution as a reference are output in a multilayered manner.

When the transmission quality controller 21 changes the resolution, it may not change the resolution of the video image acquired by the image capturing unit 14 of the terminal 10 including the transmission quality controller 21 and transmit only image layers of a Spatial layer and lower-order layers in accordance with the determined quality from multilayered resolution data encoded by the SVC codec using the above-mentioned resolution as a reference.

When the transmission quality controller 21 changes the frame rate, for example, it changes the frame rate of the video image that is transmitted from the terminal 10 including the transmission quality controller 21. For example, a frame rate corresponding to each of high quality and low resolution is previously set and the transmission quality controller 21 controls the image capturing unit 14 so as to acquire the video image at a frame rate in accordance with the determined quality. In this case, the transmission quality controller 21 changes the frame rate of the video image that is acquired from the device and the frame rate is therefore changed independently of a codec. When the SVC codec is used, quality with a determined maximum frame rate that is output from the encoder is provided and pieces of data obtained by hierarchical thinning using the above-mentioned frame rate as a reference are output in a multilayered manner.

The transmission quality controller 21 may not change the frame rate of the video image that is acquired by the image capturing unit 14 of the terminal 10 including the transmission quality controller 21 and transmit only layers of a Temporal layer and lower-order layers in accordance with the determined quality from multilayered time-axis data encoded by the SVC codec using the above-mentioned frame rate as a reference.

The transmission quality controller 21 may change color information. For example, the transmission quality controller 21 changes color information of the video image that is transmitted from the terminal 10 including the transmission quality controller 21. For example, when the determined quality is high quality, the transmission quality controller 21 transmits a color video image. On the other hand, when the determined quality is low quality, the transmission quality controller 21 converts the video image into monochrome (grayscale) by deleting the color information and compresses and transmits it.

The transmission quality controller 21 may control quality of the audio. For example, the transmission quality controller 21 dynamically changes a sampling rate of the audio data that is transmitted from the terminal 10 including the transmission quality controller 21. For example, a sampling rate corresponding to each of high quality and low quality is previously set and the transmission quality controller 21 changes control of the audio input unit 15a so as to acquire the audio data at a sampling rate in accordance with determined quality.

While the low-quality audio data is determined to be transmitted, the transmission quality controller 21 may set the audio input unit 15a to be in a mute state (vanish) so as not to acquire and transmit the audio data. When the quality is recovered to high-quality, the transmission quality controller 21 cancels the mute state and restarts acquisition and transmission of the audio data normally.

Figure 16:
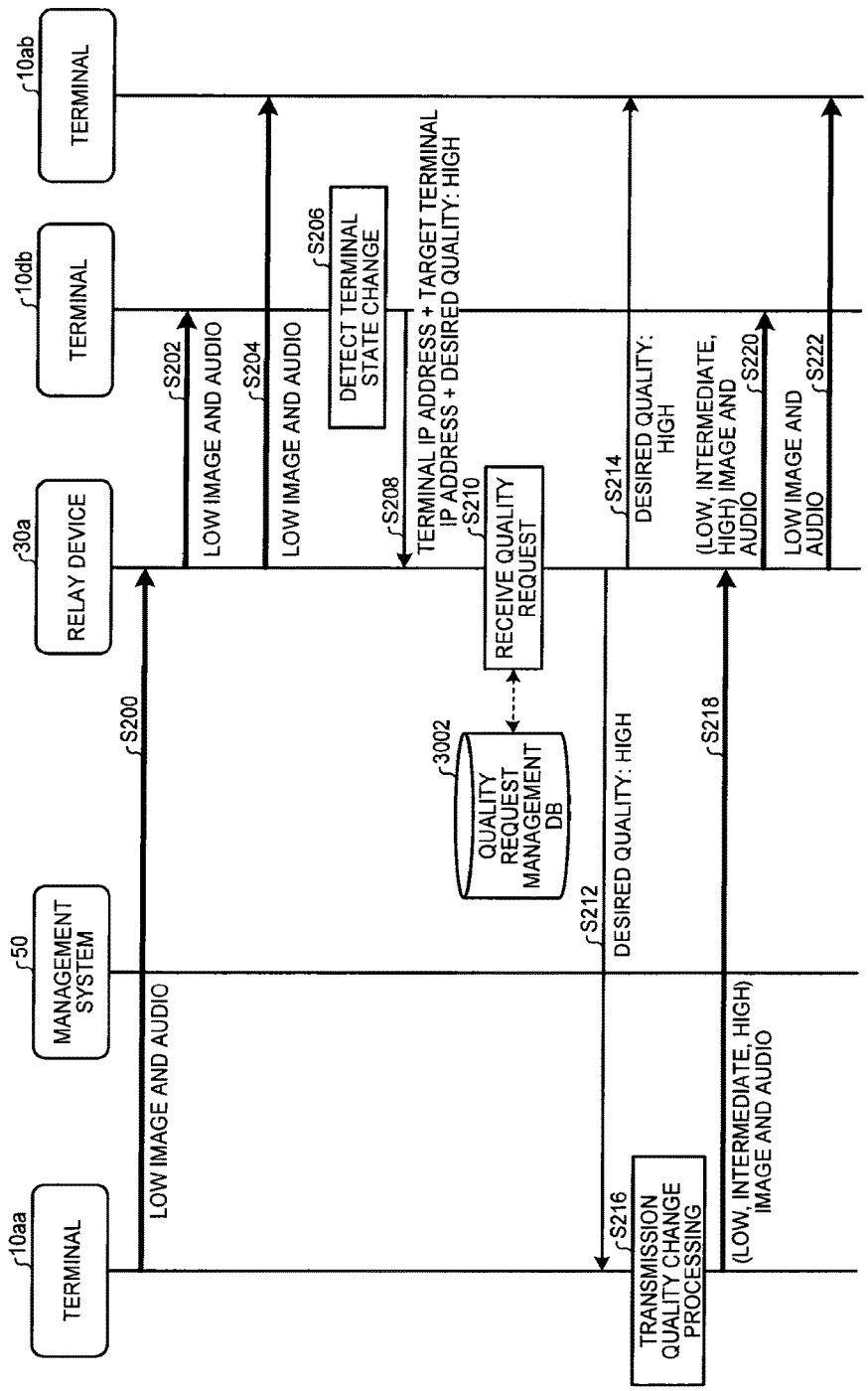
FIG. 16 is a diagram illustrating a first notification example of terminal state change to the transmission terminals.

Next, the case where the terminal issues a request for desired quality to the relay device 30a in the processing at step S118 as illustrated in FIG. 15 will be described with reference to FIG. 16 and FIG. 17. In FIG. 16, it is assumed that there is no user of the transmission terminal 10aa and the transmission terminal 10aa is in the "waiting state". In this case, all the pieces of image data and audio data that are transmitted from the transmission terminal 10aa are limited to be low quality only (step S200).

With this limitation, the pieces of image data and audio data that are transmitted to the transmission terminal 10db and the transmission terminal 10ab through the relay device 30a are also low quality only (step S202 and step S204). Then, it is assumed that the transmission terminal 10db performs the above-mentioned state detection at a timing of step S206 and transitions to be in the active state. In this case, the transmission terminal 10db requests high-quality sources that are transmitted from the transmission terminal 10aa and the transmission terminal 10ab and are received by the transmission terminal 10db (step S208). The relay device 30a that has received the request changes the quality request management DB 3002 in processing at step S210 and records therein a fact indicating that the transmission terminal 10db requests pieces of high-quality data from the transmission terminal 10aa and the transmission terminal 10ab.

Then, the relay device 30a requests transmission of the pieces of high-quality data from the transmission terminal 10aa and the transmission terminal 10ab (step S212 and step S214). The transmission terminal 10aa, that has received the request, changes quality of a transmission target medium using the above-mentioned method (step S216). The transmission terminal 10aa transmits all the multilayered streams provided by using the SVC codec so as to transmit the high-quality data. With this transmission, the image data and the audio data that are transmitted from the transmission terminal 10aa contain all the streams of high-quality, intermediate-quality, and low-quality (step S218).

The relay device 30a that has received the pieces of data can check, with reference to the quality request management DB 3002, the fact indicating that the transmission terminal 10db requests the pieces of high-quality data from the transmission terminal 10aa and the transmission terminal 10ab requests pieces of low-quality data from the transmission terminal 10aa, and therefore performs filtering processing based on the fact. That is to say, the relay device 30a transfers all the streams of high quality, intermediate quality, and low quality to the transmission terminal 10db (step S220) and transfers only the stream of low quality to the transmission terminal 10ab (step S222).

Next, a sequence when the transmission terminal 10db returns to be in the waiting state from the state as illustrated in FIG. 16 will be described with reference to FIG. 17. The states at step S300, step S302, and step S304 as illustrated in FIG. 17 are the same as the states at step S218, step S220, and step S222 as illustrated in FIG. 16.

It is assumed that no user is detected around the transmission terminal 10db after a predetermined period time has passed from the transition thereof to the active state, and the transmission terminal 10db transitions to be in the waiting state (step S306). In this case, in the same manner as the request in the processing at step S208 as illustrated in FIG. 16, the transmission terminal 10db requests low-quality sources that are transmitted from the transmission terminal 10aa and the transmission terminal 10ab and are received by the transmission terminal 10db so as to cancel the previous request for high quality (step S308).

The relay device 30a that has received the request changes the quality request management DB 3002 in processing at step S310 and records therein a fact indicating that the transmission terminal 10db requests the pieces of low-quality data from the transmission terminal 10aa and the transmission terminal 10ab. Then, the relay device 30a can check the fact indicating that all the terminals request the pieces of low-quality data from the transmission terminal 10aa and the transmission terminal 10ab, and the relay device 30a therefore requests transmission of the pieces of low-quality data from the transmission terminal 10aa and the transmission terminal 10ab (step S312 and step S314). The transmission terminal 10aa, that has received the request, changes quality of a transmission target medium using the above-mentioned method (step S316). The transmission terminal 10aa transmits only the stream of the low-quality layer among the multilayered streams provided by using the SVC codec so as to transmit only low-quality data. With this transmission, the image data and the audio data that are transmitted from the transmission terminal 10aa contain only the low-quality stream (step S318).

The relay device 30a that has received the pieces of data transfers only the low-quality stream to both of the transmission terminal 10db and the transmission terminal 10ab and a network load is reduced (step S320 and step S322).

The relay device 30, the management system 50, the program provision system 90, and the maintenance system 100 in the above-mentioned embodiment may be constructed by a single computer or a plurality of computers to which the respective parts (functions or units) are dividedly optionally distributed. When the program provision system 90 is constructed by a single computer, the program that is transmitted from the program provision system 90 may be transmitted in a divided manner into a plurality of modules or transmitted in a non-divided manner. Furthermore, when the program provision system 90 is constructed by the computers, the program may be transmitted from the respective computers in a state where a plurality of modules are divided.

Any of the recording medium such as the CD-ROM storing therein the terminal program, the relay device program, or the transmission management program, the HD 204 storing therein these programs, and the program provision system 90 including the HD 204 in the above-mentioned embodiment are used when the above-mentioned terminal program, relay device program, and transmission management program are provided to users and the like inside the country or outside the country, as computer program products.

Furthermore, in the above-mentioned embodiment, the change quality management table as illustrated in FIG. 9 and the quality management table as illustrated in FIG. 17 are used to manage quality of images of pieces of image data that are relayed by the relay device 30 while focusing on the resolution as an example. The quality is not limited to the resolution and may be managed while focusing on depth of image quality of the image data, a sampling frequency of audio of audio data, and a bit length of the audio of the audio data as other examples of the quality. Furthermore, the audio data may be transmitted and received in a state of being divided into pieces of data at resolutions of three types (high resolution, intermediate resolution, and low resolution).

Although the reception date and time are managed in FIG. 7, FIG. 9, and FIG. 11, the invention is not limited thereto and it is sufficient that at least the reception time out of the reception date and time is managed.

Furthermore, although the IP addresses of the relay devices are managed in FIG. 7 and the IP addresses of the terminals are managed in FIG. 9 in the above-mentioned embodiment, the invention is not limited thereto and fully qualified domain names (FQDN) thereof may be managed as long as they are pieces of relay device identification information for identifying the relay devices 30 on the communication network 2 or pieces of terminal identification information for identifying the terminals 10 on the communication network 2. In this case, a well-known domain name system (DNS) server acquires the IP addresses corresponding to the FQDNs. In addition to the "pieces of relay device identification information for identifying the relay devices 30 on the communication network 2", they may be expressed as "pieces of relay device connection destination information on connection destinations to the relay devices 30 on the communication network 2" or "pieces of relay device destination information on destinations to the relay devices 30 on the communication network 2". In the same manner, in addition to the "pieces of terminal identification information for identifying the terminals 10 on the communication network 2", they may be expressed as "pieces of terminal connection destination information on connection destinations to the terminals 10 on the communication network 2" or "pieces of terminal destination information on destinations to the terminals 10 on the communication network 2".

Although the transmission system 1 is the video conference system as an example in the above-mentioned embodiment, the transmission system 1 is not limited thereto and may be a telephone system such as an Internet protocol (IP) telephone and an Internet telephone. Alternatively, the transmission system 1 may be a vehicle navigation system. In this case, for example, one terminal 10 corresponds to a vehicle navigation device mounted on a vehicle and the other terminal 10 corresponds to a management terminal or a management server in a management center managing the vehicle navigation or corresponds to a vehicle navigation device mounted on another vehicle. Moreover, the transmission system 1 may be a communication system for a mobile phone. In this case, for example, the terminal 10 corresponds to the mobile phone.

In addition, although the image data and the audio data have been described as an example of the content data in the above-mentioned embodiment, the content data is not limited thereto and may be tactile data. In this case, a sense of touch by the user at one terminal side is transmitted to the other terminal side. Alternatively, the content data may be smell data. In this case, smell at one terminal side is transmitted to the other terminal side. It is sufficient that the content data is at least one of the image data, the audio data, the tactile data, and the smell data.

Although the video conference is held by the transmission system 1 in the above-mentioned embodiment, the invention is not limited thereto and the transmission system 1 may be used for a meeting, common conversation between family members, between friends, or the like, or proposal of information in one direction.

The embodiments of the present invention provides an effect that load of transmission on a network can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A transmission system transmitting at least one of image data and audio data among a plurality of transmission terminals, the transmission system comprising:

a first transmission terminal including
a state detector configured to detect whether or not a user is present around the first transmission terminal, and
first processing circuitry configured to transmit, to a second transmission terminal, correspondence data corresponding to a state detected by the state detector, when the state detected by the state detector changes; and
the second transmission terminal including
second processing circuitry configured to, when the second processing circuitry receives the correspondence data, change a resolution of the image data into a predetermined maximum resolution, and transmit, to the first transmission terminal, pieces of the changed image data at resolutions lowered hierarchically from the maximum resolution as a reference.

2. The transmission system according to claim 1, wherein the first processing circuitry is further configured to change a quality of at least one of other image data and other audio data that is to be transmitted to the second transmission terminal, in accordance with the correspondence data, and transmit the at least one of the other image data and the other audio data having the changed quality, when the state detected by the state detector changes.

3. The transmission system according to claim 1, wherein the second processing circuitry is further configured to transmit at least one of the image data and the audio data to the first transmission terminal through a relay device relaying at least one of the image data and the audio data among the transmission terminals, and
the relay device changes a quality of at least one of the image data and the audio data in accordance with the correspondence data, and transmits at least one of the image data and the audio data having the changed quality to only the first transmission terminal that has transmitted the correspondence data.

4. The transmission system according to claim 1, wherein the first transmission terminal further includes a camera that performs image capturing, and
the state detector is configured to detect that a user is present around the first transmission terminal when a change amount between frames of an image captured by the camera exceeds a certain threshold or when a region of a face of a person detected from the image captured by the camera exceeds a certain size.

5. The transmission system according to claim 1, wherein the first transmission terminal further includes an audio input unit acquiring audio input, a sensor detecting presence of an object or a person, or an operation input receiver receiving operation input, and the state detector is configured to detect that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

6. The transmission system according to claim 1, wherein when the second transmission terminal receives the correspondence data, the second processing circuitry is configured to change a quality of the audio data that is transmitted to the first transmission terminal in accordance with the correspondence data by changing a sampling rate of the audio data, and transmit the changed audio data.

7. A transmission terminal, comprising:
a transmitter configured to transmit data to an other transmission terminal, and
processing circuitry configured to change a resolution of image data into a predetermined maximum resolution, and transmit, to the other transmission terminal, pieces of the changed image data at resolutions lowered hierarchically from the maximum resolution as a reference in accordance with correspondence data received from the other transmission terminal and corresponding to a result of detection of a change of a state indicating whether or not a user is present around the other transmission terminal, in response to the transmission terminal receiving the correspondence data from the other transmission terminal.

8. A transmission method in which at least one of image data and audio data is transmitted among a plurality of transmission terminals, the transmission method comprising:
detecting, by a first transmission terminal, whether or not a user is present around the first transmission terminal; and
transmitting, from the first transmission terminal to a second transmission terminal, correspondence data corresponding to a detected state, when the detected state changes; and
when the second transmission terminal receives the correspondence data, changing a resolution of the image data into a predetermined maximum resolution, and transmitting, to the first transmission terminal, pieces of the changed image data at resolutions lowered hierarchically from the maximum resolution as a reference.

9. The transmission method according to claim 8, further comprising:
changing, by the first transmission terminal, a quality of at least one of other image data and other audio data that is to be transmitted to the second transmission terminal in accordance with the correspondence data, and transmitting, by the first transmission terminal, the at least one of the other image data and the other audio data having the changed quality, when the detected state changes.

10. The transmission method according to claim 8, further comprising:
transmitting, by the second transmission terminal, at least one of the image data and the audio data to the first transmission terminal through a relay device relaying at least one of the image data and the audio data among the transmission terminals, and
changing, by the relay device, a quality of at least one of the image data and the audio data in accordance with the correspondence data, and transmitting, by the relay device, at least one of the image data and the audio data to only the first transmission terminal that has transmitted the correspondence data.

11. The transmission method according to claim 8, therein the first transmission terminal includes a camera that performs image capturing, and
the transmission method further comprises detecting that a user is present around the first transmission terminal when a change amount between frames of an image captured by the camera exceeds a certain threshold or when a region of a face of a person detected from the image captured by the camera exceeds a certain size.

12. The transmission method according to claim 8, wherein
the first transmission terminal further includes an audio input unit acquiring audio input, a sensor detecting presence of an object or a person, or an operation input receiver receiving operation input, and
the transmission method further comprises detecting that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

13. The transmission method according to claim 8, further comprising:
changing, by the second transmission terminal, a quality of the audio data that is transmitted to the first transmission terminal in accordance with the correspondence data by changing a sampling rate of the audio data, and transmitting, by the second transmission terminal, the changed audio data, when the second transmission terminal receives the correspondence data.

14. A transmission system transmitting at least one of image data and audio data among a plurality of transmission terminals, the transmission system comprising:
a first transmission terminal including
a state detector configured to detect whether or not a user is present around the first transmission terminal, and
first processing circuitry configured to transmit, to a second transmission terminal, correspondence data corresponding to a state detected by the state detector, when the state detected by the state detector changes; and
the second transmission terminal including
second processing circuitry configured to, when the second processing circuitry receives the correspondence data, change a frame rate of the image data into a predetermined maximum frame rate, and transmit, to the first transmission terminal, pieces of the changed image data obtained by hierarchical thinning using the maximum frame rate as a reference.

15. A transmission system transmitting at least one of image data and audio data among a plurality of transmission terminals, the transmission system comprising:
a first transmission terminal including
a state detector configured to detect whether or not a user is present around the first transmission terminal, and
first processing circuitry configured to transmit, to a second transmission terminal, correspondence data corresponding to a state detected by the state detector, when the state detected by the state detector changes; and
the second transmission terminal including
second processing circuitry configured to, when the second processing circuitry receives the correspondence data, transmit, to the first transmission terminal, only layers in accordance with a predetermined quality from multilayered time-axis data using a predetermined frame rate of the image data as a reference.

16. A transmission system transmitting at least one of image data and audio data among a plurality of transmission terminals, the transmission system comprising:
a first transmission terminal including
a state detector configured to detect whether or not a user is present around the first transmission terminal, and
first processing circuitry configured to transmit, to a second transmission terminal, correspondence data corresponding to a state detected by the state detector, when the state detected by the state detector changes; and
the second transmission terminal including
second processing circuitry configured to, when the second processing circuitry receives the correspondence data, change color information of the image data into high quality, and transmit, to the first transmission terminal, color image data, or change the color information of the image data into low quality, and transmit, to the first transmission terminal, monochrome image data.

17. The transmission system of claim 14, wherein
the first processing circuitry is further configured to change a quality of at least one of other image data and other audio data that is to be transmitted to the second transmission terminal, in accordance with the correspondence data, and transmit the at least one of the other image data and the other audio data having the changed quality, when the state detected by the state detector changes.

18. The transmission system of claim 14, wherein
the second processing circuitry is further configured to transmit at least one of the image data and the audio data to the first transmission terminal through a relay device relaying at least one of the image data and the audio data among the transmission terminals, and
the relay device changes a quality of at least one of the image data and the audio data in accordance with the correspondence data, and transmits at least one of the image data and the audio data having the changed quality to only the first transmission terminal that has transmitted the correspondence data.

19. The transmission system of claim 14, wherein
the first transmission terminal further includes a camera that performs image capturing, and
the state detector is configured to detect that a user is present around the first transmission terminal when a change amount between frames of an image captured by the camera exceeds a certain threshold or when a region of a face of a person detected from the image captured by the camera exceeds a certain size.

20. The transmission system of claim 14, wherein
the first transmission terminal further includes an audio input unit acquiring audio input, a sensor detecting presence of an object or a person, or an operation input receiver receiving operation input, and the state detector is configured to detect that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

21. The transmission system of claim 14, wherein
when the second transmission terminal receives the correspondence data, the second processing circuitry is configured to change a quality of the audio data that is transmitted to the first transmission terminal in accordance with the correspondence data by changing a sampling rate of the audio data, and transmit the changed audio data.

22. The transmission system of claim 15, wherein
the first processing circuitry is further configured to change a quality of at least one of other image data and other audio data that is to be transmitted to the second transmission terminal, in accordance with the correspondence data, and transmit the at least one of the other image data and the other audio data having the changed quality, when the state detected by the state detector changes.

23. The transmission system of claim 15, wherein
the second processing circuitry is further configured to transmit at least one of the image data and the audio data to the first transmission terminal through a relay device relaying at least one of the image data and the audio data among the transmission terminals, and
the relay device changes a quality of at least one of the image data and the audio data in accordance with the correspondence data, and transmits at least one of the image data and the audio data having the changed quality to only the first transmission terminal that has transmitted the correspondence data.

24. The transmission system of claim 15, wherein
the first transmission terminal further includes a camera that performs image capturing, and
the state detector is configured to detect that a user is present around the first transmission terminal when a change amount between frames of an image captured by the camera exceeds a certain threshold or when a region of a face of a person detected from the image captured by the camera exceeds a certain size.

25. The transmission system of claim 15, wherein
the first transmission terminal further includes an audio input unit acquiring audio input, a sensor detecting presence of an object or a person, or an operation input receiver receiving operation input, and
the state detector is configured to detect that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

26. The transmission system of claim 15, wherein
when the second transmission terminal receives the correspondence data, the second processing circuitry is configured to change a quality of the audio data that is transmitted to the first transmission terminal in accordance with the correspondence data by changing a sampling rate of the audio data, and transmit the changed audio data.

27. The transmission system of claim 16, wherein
the first processing circuitry is further configured to change a quality of at least one of other image data and other audio data that is to be transmitted to the second transmission terminal, in accordance with the correspondence data, and transmit the at least one of the other image data and the other audio data having the changed quality, when the state detected by the state detector changes.

28. The transmission system of claim 16, wherein
the second processing circuitry is further configured to transmit at least one of the image data and the audio data to the first transmission terminal through a relay device relaying at least one of the image data and the audio data among the transmission terminals, and
the relay device changes a quality of at least one of the image data and the audio data in accordance with the correspondence data, and transmits at least one of the image data and the audio data having the changed quality to only the first transmission terminal that has transmitted the correspondence data.

29. The transmission system of claim 16, wherein
the first transmission terminal further includes a camera that performs image capturing, and
the state detector is configured to detect that a user is present around the first transmission terminal when a change amount between frames of an image captured by the camera exceeds a certain threshold or when a region of a face of a person detected from the image captured by the camera exceeds a certain size.

30. The transmission system of claim 16, wherein
the first transmission terminal further includes an audio input unit acquiring audio input, a sensor detecting presence of an object or a person, or an operation input receiver receiving operation input, and
the state detector is configured to detect that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

31. The transmission system of claim 16, wherein
when the second transmission terminal receives the correspondence data, the second processing circuitry is configured to change a quality of the audio data that is transmitted to the first transmission terminal in accordance with the correspondence data by changing a sampling rate of the audio data, and transmit the changed audio data.

32. A transmission terminal, comprising:
a transmitter configured to transmit image data to an other transmission terminal, and
processing circuitry configured to change a frame rate of the image data into a predetermined maximum frame rate, and transmit, to the other transmission terminal, pieces of the changed image data obtained by hierarchical thinning using the maximum frame rate as a reference in accordance with correspondence data received from the other transmission terminal and corresponding to a result of detection of a change of a state indicating whether or not a user is present around the other transmission terminal, in response to the transmission terminal receiving the correspondence data from the other transmission terminal.

33. A transmission terminal, comprising:
a transmitter configured to transmit image data to an other transmission terminal, and
processing circuitry configured to transmit, to the other transmission terminal, only layers in accordance with a predetermined quality from multilayered time-axis data using a predetermined frame rate of the image data as a reference in accordance with correspondence data received from the other transmission terminal and corresponding to a result of detection of a change of a state indicating whether or not a user is present around the other transmission terminal, in response to the transmission terminal receiving the correspondence data from the other transmission terminal.

34. A transmission terminal, comprising:
a transmitter configured to transmit image data to an other transmission terminal, and
processing circuitry configured to change color information of the image data into high quality, and transmit, to the other transmission terminal, color image data, or change the color information of the image data into low quality, and transmit, to the other transmission terminal, monochrome image data in accordance with correspondence data received from the other transmission terminal and corresponding to a result of detection of a change of a state indicating whether or not a user is present around the other transmission terminal, in response to the transmission terminal receiving the correspondence data from the other transmission terminal.

35. A transmission method in which at least one of image data and audio data is transmitted among a plurality of transmission terminals, the transmission method comprising:
detecting, by a first transmission terminal, whether or not a user is present around the first transmission terminal; and
transmitting, from the first transmission terminal to a second transmission terminal, correspondence data corresponding to a detected state, when the detected state changes; and
when the second transmission terminal receives the correspondence data, changing a frame rate of the image data into a predetermined maximum frame rate, and transmit, to the first transmission terminal, pieces of the changed image data obtained by hierarchical thinning using the maximum frame rate as a reference.

36. A transmission method in which at least one of image data and audio data is transmitted among a plurality of transmission terminals, the transmission method comprising:
detecting, by a first transmission terminal, whether or not a user is present around the first transmission terminal; and
transmitting, from the first transmission terminal to a second transmission terminal, correspondence data corresponding to a detected state, when the detected state changes; and
when the second transmission terminal receives the correspondence data, transmit, to the first transmission terminal, only layers in accordance with a predetermined quality from multilayered time-axis data using a predetermined frame rate of the image data as a reference.

37. A transmission method in which at least one of image data and audio data is transmitted among a plurality of transmission terminals, the transmission method comprising:
detecting, by a first transmission terminal, whether or not a user is present around the first transmission terminal; and
transmitting, from the first transmission terminal to a second transmission terminal, correspondence data corresponding to a detected state, when the detected state changes; and
when the second transmission terminal receives the correspondence data, changing color information of the image data into high quality, and transmitting, to the first transmission terminal, color image data, or changing the color information of the image data into low quality, and transmitting, to the first transmission terminal, monochrome image data.

38. The transmission method of claim 35, further comprising:
changing, by the first transmission terminal, a quality of at least one of other image data and other audio data that is to be transmitted to the second transmission terminal in accordance with the correspondence data, and transmitting, by the first transmission terminal, the at least one of the other image data and the other audio data having the changed quality, when the detected state changes.

39. The transmission method of claim 35, further comprising:
transmitting, by the second transmission terminal, at least one of the image data and the audio data to the first transmission terminal through a relay device relaying at least one of the image data and the audio data among the transmission terminals, and
changing, by the relay device, a quality of at least one of the image data and the audio data in accordance with the correspondence data, and transmitting, by the relay device, at least one of the image data and the audio data to only the first transmission terminal that has transmitted the correspondence data.

40. The transmission method of claim 35, wherein
the first transmission terminal includes a camera that performs image capturing, and
the transmission method further comprises detecting that a user is present around the first transmission terminal when a change amount between frames of an image captured by the camera exceeds a certain threshold or when a region of a face of a person detected from the image captured by the camera exceeds a certain size.

41. The transmission method of claim 35, wherein
the first transmission terminal further includes an audio input unit acquiring audio input, a sensor detecting presence of an object or a person, or an operation input receiver receiving operation input, and
the transmission method further comprises detecting that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

42. The transmission method of claim 35, further comprising:
changing, by the second transmission terminal, a quality of the audio data that is transmitted to the first transmission terminal in accordance with the correspondence data by changing a sampling rate of the audio data, and transmitting, by the second transmission terminal, the changed audio data, when the second transmission terminal receives the correspondence data.

43. The transmission method of claim 36, further comprising:
changing, by the first transmission terminal, a quality of at least one of other image data and other audio data that is to be transmitted to the second transmission terminal in accordance with the correspondence data, and transmitting, by the first transmission terminal, the at least one of the other image data and the other audio data having the changed quality, when the detected state changes.

44. The transmission method of claim 36, further comprising:
transmitting, by the second transmission terminal, at least one of the image data and the audio data to the first transmission terminal through a relay device relaying at least one of the image data and the audio data among the transmission terminals, and
changing, by the relay device, a quality of at least one of the image data and the audio data in accordance with the correspondence data, and transmitting, by the relay device, at least one of the image data and the audio data to only the first transmission terminal that has transmitted the correspondence data.

45. The transmission method of claim 36, wherein
the first transmission terminal includes a camera that performs image capturing, and
the transmission method further comprises detecting that a user is present around the first transmission terminal when a change amount between frames of an image captured by the camera exceeds a certain threshold or when a region of a face of a person detected from the image captured by the camera exceeds a certain size.

46. The transmission method of claim 36, wherein
the first transmission terminal further includes an audio input unit acquiring audio input, a sensor detecting presence of an object or a person, or an operation input receiver receiving operation input, and
the transmission method further comprises detecting that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

47. The transmission method of claim 36, further comprising:
changing, by the second transmission terminal, a quality of the audio data that is transmitted to the first transmission terminal in accordance with the correspondence data by changing a sampling rate of the audio data, and transmitting, by the second transmission terminal, the changed audio data, when the second transmission terminal receives the correspondence data.

48. The transmission method of claim 37, further comprising:
changing, by the first transmission terminal, a quality of at least one of other image data and other audio data that is to be transmitted to the second transmission terminal in accordance with the correspondence data, and transmitting, by the first transmission terminal, the at least one of the other image data and the other audio data having the changed quality, when the detected state changes.

49. The transmission method of claim 37, further comprising:
transmitting, by the second transmission terminal, at least one of the image data and the audio data to the first transmission terminal through a relay device relaying at least one of the image data and the audio data among the transmission terminals, and
changing, by the relay device, a quality of at least one of the image data and the audio data in accordance with the correspondence data, and transmitting, by the relay device, at least one of the image data and the audio data to only the first transmission terminal that has transmitted the correspondence data.

50. The transmission method of claim 37, wherein
the first transmission terminal includes a camera that performs image capturing, and
the transmission method further comprises detecting that a user is present around the first transmission terminal when a change amount between frames of an image captured by the camera exceeds a certain threshold or when a region of a face of a person detected from the image captured by the camera exceeds a certain size.

51. The transmission method of claim 37, wherein
the first transmission terminal further includes an audio input unit acquiring audio input, a sensor detecting presence of an object or a person, or an operation input receiver receiving operation input, and
the transmission method further comprises detecting that a user is present around the first transmission terminal when the audio input acquired by the audio input unit exceeds a certain threshold, when a period of time during which the sensor detects the presence of the object or the person exceeds a certain threshold, or when the operation input receiver receives the operation input.

52. The transmission method of claim 37, further comprising:
changing, by the second transmission terminal, a quality of the audio data that is transmitted to the first transmission terminal in accordance with the correspondence data by changing a sampling rate of the audio data, and transmitting, by the second transmission terminal, the changed audio data, when the second transmission terminal receives the correspondence data.

* * * * *